(12) United States Patent
D'Souza et al.

(10) Patent No.: US 10,311,511 B2
(45) Date of Patent: Jun. 4, 2019

(54) CONNECTED DEVICE-BASED PROPERTY EVALUATION

(71) Applicant: The Toronto-Dominion Bank, Toronto (CA)

(72) Inventors: Roy D'Souza, Oakville (CA); Roisin Lara Fritz, Toronto (CA); Jonathan K. Barnett, Oakville (CA); Paul Mon-Wah Chan, Markham (CA); John Jong-Suk Lee, Waterloo (CA); Orin Del Vecchio, Richmond Hill (CA)

(73) Assignee: The Toronto-Dominion Bank, Toronto, Ontario ( * ) Notice: Subject to any disclaimer, the term of this patent is extended or adjusted under 35 U.S.C. 154(b) by 293 days.

(21) Appl. No.: 15/265,270

(22) Filed: Sep. 14, 2016

(65) Prior Publication Data
US 2017/0076408 A1 Mar. 16, 2017

Related U.S. Application Data

(60) Provisional application No. 62/218,451, filed on Sep. 14, 2015.

(51) Int. Cl.
| G06Q 50/16 | (2012.01) |
| G06Q 40/00 | (2012.01) |
| G06Q 10/10 | (2012.01) |
| G06Q 20/10 | (2012.01) |
| G06Q 50/08 | (2012.01) |
| G06Q 10/00 | (2012.01) |
| G06Q 90/00 | (2006.01) |

(52) U.S. Cl.
CPC .......... *G06Q 40/00* (2013.01); *G06Q 10/109* (2013.01); *G06Q 10/20* (2013.01); *G06Q 20/10* (2013.01); *G06Q 50/08* (2013.01); *G06Q 50/163* (2013.01)

(58) Field of Classification Search
CPC combination set(s) only.
See application file for complete search history.

(56) References Cited

U.S. PATENT DOCUMENTS

| 8,019,694 B2 | 9/2011 | Fell et al. |
| 9,280,681 B2 * | 3/2016 | Gettings ................ G08B 23/00 |
| 9,593,861 B1 * | 3/2017 | Burnett .................... F24F 11/08 |
| 9,875,492 B2 * | 1/2018 | Dupray .................. G06Q 30/02 |

(Continued)

*Primary Examiner* — Mark A Fleischer
(74) *Attorney, Agent, or Firm* — Fish & Richardson P.C.

(57) ABSTRACT

The present disclosure involves systems and computer implemented methods for performing a connected device-based property evaluation. In one example, operations include identifying a property associated with an initial price and collecting information about the property by receiving information from one or more connected devices associated with the property. The one or more connected devices can each have a sensor for monitoring a condition within the property, and can providing information about the condition to the connected device, where the information is associated with a current status of the identified property. At least one action to be performed at the property based on the collected information is determined, with each action corresponding to an element at the property. An aggregate set of cost information associated with each determined action is determined and combined with the initial price to determine a modified purchase price. The modified price is then presented.

19 Claims, 5 Drawing Sheets

(56) References Cited

U.S. PATENT DOCUMENTS

| | | |
|---|---|---|
| 2002/0128953 A1 | 9/2002 | Quallen et al. |
| 2002/0147681 A1 | 10/2002 | Taninaka et al. |
| 2004/0186763 A1 | 9/2004 | Smith |
| 2005/0086158 A1* | 4/2005 | Clare .................... G06Q 30/02 |
| | | 705/38 |
| 2008/0027840 A1 | 1/2008 | Allin |
| 2009/0106135 A1 | 4/2009 | Steiger |
| 2009/0182600 A1 | 7/2009 | Lungu |
| 2010/0153259 A1 | 6/2010 | Stanton |
| 2013/0018813 A1 | 1/2013 | Carroll et al. |
| 2013/0041841 A1 | 2/2013 | Lyons |
| 2013/0218780 A1 | 8/2013 | Buzz |
| 2014/0032433 A1* | 1/2014 | Eick .................... G06Q 50/163 |
| | | 705/314 |
| 2014/0236768 A1 | 8/2014 | Aickin |
| 2014/0278568 A1 | 9/2014 | Ekman |
| 2015/0170233 A1* | 6/2015 | Lisitsa .................. H01L 23/427 |
| | | 705/26.1 |
| 2017/0046799 A1 | 2/2017 | Chan |

\* cited by examiner

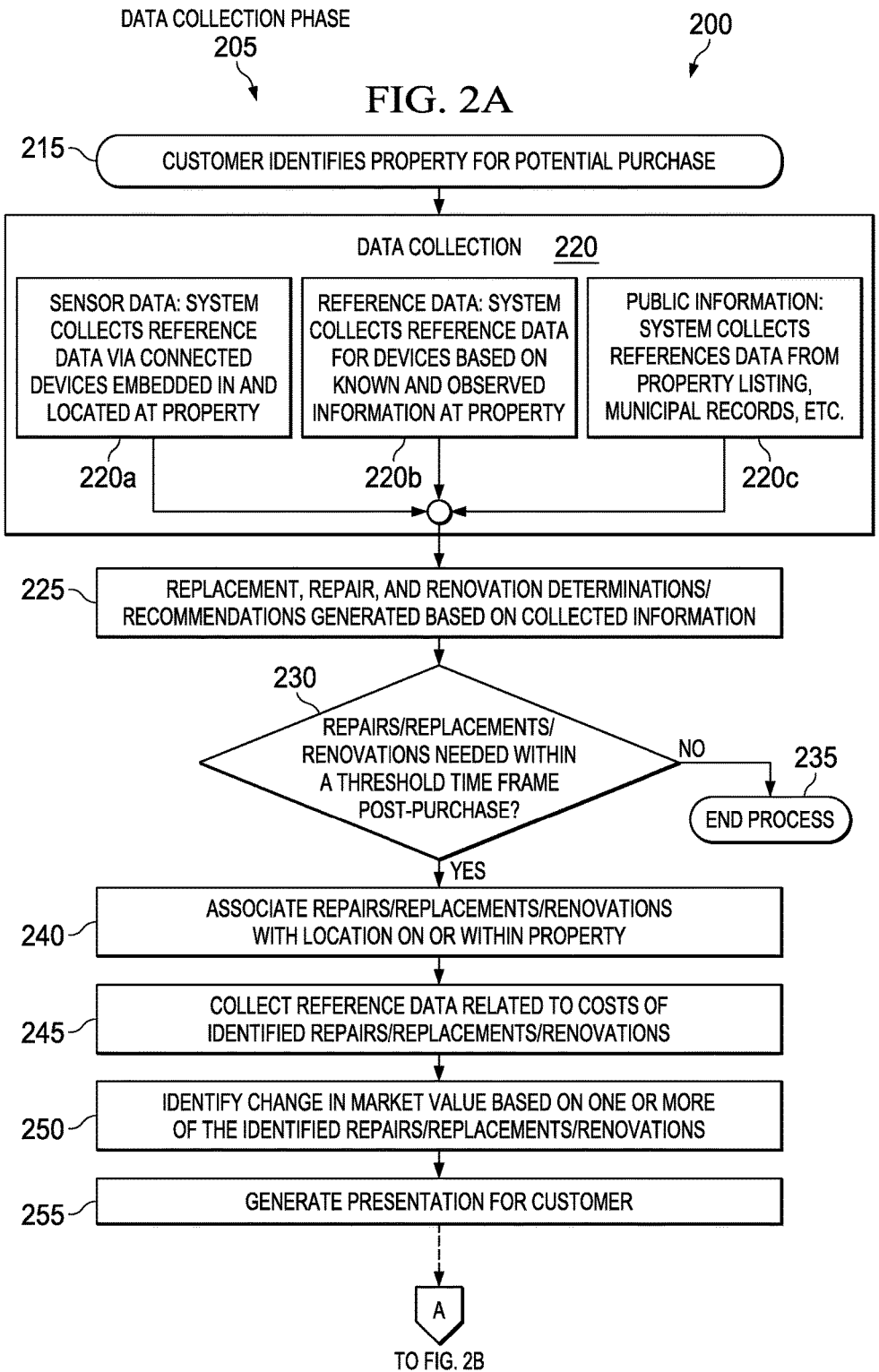

CONNECTED DEVICE-BASED PROPERTY EVALUATION

CROSS-REFERENCE TO RELATED APPLICATIONS

This application claims the benefit of priority to U.S. Provisional Patent Application Ser. No. 62/218,451, filed on Sep. 14, 2015, the contents of which are hereby incorporated by reference.

TECHNICAL FIELD

The present disclosure relates to computer systems and computer-implemented methods for performing a connected device-based property evaluation.

The network of connected devices can include a network of physical objects, or "things," embedded within electronics, software, sensors, and connectivity to enable and achieve greater value and service by exchanging data with the manufacturer, operator, and/or other connected devices or systems. Each device can be uniquely identifiable through its embedded computing system, and can interoperate through the existing Internet or local network infrastructure. In many cases, implementations of the network can provide services including machine-to-machine communications (M2M), such that the information received from one machine can influence or modify the actions and activities of other machines.

SUMMARY

The present disclosure involves systems and computer implemented methods for performing a connected device-based property evaluation. In one example, a system may comprise memory and at least one hardware processor interoperably coupled with the memory, where the memory includes instructions that instruct the at least one hardware processor to perform operations. Those operations can include identifying a property, where the identified property is associated with an initial price. Information related to the property can be collected by receiving information from one or more connected devices associated with the identified property, where the one or more connected devices each have one or more sensors for monitoring a condition within the identified property, where the sensors provide information about the condition to the connected device. The information provided can be associated with a current status of the identified property. At least one action to be performed at the property can be determined based on the collected information, with each of the at least one determined actions corresponding to an element at the property. A set of cost information corresponding to each of the at least one determined actions can be determined. An aggregate cost of the determined cost information associated with each of the at least one determined actions can be determined. The initial price of the property can be combined with the aggregate cost of the determined cost information to determine a modified price, where the modified price is then presented.

In some instances, at least a subset of the one or more connected devices is located at the identified property, and each of the one or more connected devices located at the identified property monitors a condition at a particular location at the identified property.

In some instances, monitoring conditions at particular locations within the identified property can include monitoring operations of one or more particular devices at particular locations within the identified property. In some of those instances, monitoring operations of the one or more particular devices at particular locations can include performing an end-of-life analysis to determine a remaining life span of the one or more particular devices. Further, determining at least one action to be performed at the property based on the collected information can include, in response to determining that the remaining life span of the one or more particular devices is less than a threshold amount, determining that an action corresponding to the one or more particular devices is required. The determined action corresponding to the one or more particular devices may be repairing or replacing the one or more particular devices.

In some instances, monitoring conditions at particular locations within the identified property includes monitoring environmental conditions at the particular locations, wherein monitoring environmental conditions at particular locations can include identifying at least one environmental condition outside a threshold condition. In those instances, determining at least one action to be performed at the property based on the collected information can include, in response to determining that the at least one environmental condition at the particular locations is outside a threshold condition, determining that an action corresponding to the one or more connected devices is required, wherein the determined action is performing a repair or renovation of the identified property at the corresponding particular location.

In some instances, the operations further include generating an interactive walkthrough presentation of the identified property based on the at least one determined action and the corresponding set of determined cost information for each of the at least one determined action, wherein the interactive walkthrough presentation associates each determined action and corresponding set of determined cost information to the corresponding locations within the property.

In some instances, the generated interactive walkthrough presentation is generated for an augmented reality presentation presented during a physical walkthrough of the identified property. In those instances, presenting the modified price can include presenting the interactive walkthrough presentation of the identified property to a potential purchaser during a physical walkthrough of the identified property, wherein the determined actions and corresponding set of determined cost information are presented to the potential purchaser in an augmented reality presentation in response to the potential purchaser reaching the corresponding locations within the property during the physical walkthrough of the identified property.

In some instances, the generated interactive walkthrough presentation is generated for a virtual reality presentation presented during a virtual walkthrough of the identified property. In those instances, presenting the modified price can include presenting the interactive walkthrough presentation of the identified property to a potential purchaser during a virtual walkthrough of the identified property, where the determined actions and corresponding set of determined cost information are presented to the potential purchaser in a virtual reality presentation in response to the potential purchaser reaching the corresponding locations within the property during the virtual walkthrough of the identified property.

In some instances, where the modified price is a modified purchase price, the operations can further include providing the modified purchase price to a lender associated with a potential purchaser in response to generating the interactive walkthrough presentation, receiving an indication from the lender indicating whether the potential purchaser is approved for funding based on the provided modified purchase price, wherein the indication whether the potential purchaser is approved for funding based on the modified purchase price is based on an calculated estimated appraisal of the identified property after the at least one determined action is performed, and present the indication to the potential purchaser during the interactive walkthrough.

In some instances, identifying the property can include identifying at least one potential purchaser-specified renovation, wherein the determining the at least one action to be performed at the property can include determining at least one action associated with the at least one potential purchaser-specified renovation, and wherein the at least one potential purchaser-specified renovation is received during the interactive walkthrough.

Similar or analogous operations and/or instructions may be stored on a computer-readable medium as non-transitory computer-readable instructions executable by a computer and processor(s) and configured to perform similar operations to the operations of the system may be used. Additionally, computerized methods executed by at least one processor can perform the operations.

While generally described as computer-implemented software embodied on non-tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 2, separated into connected FIG. 2A and FIG. 2B, is a swim lane diagram of example operations for performing a connected device-based property evaluation and presenting results of the same.

DETAILED DESCRIPTION

Figure 1A:
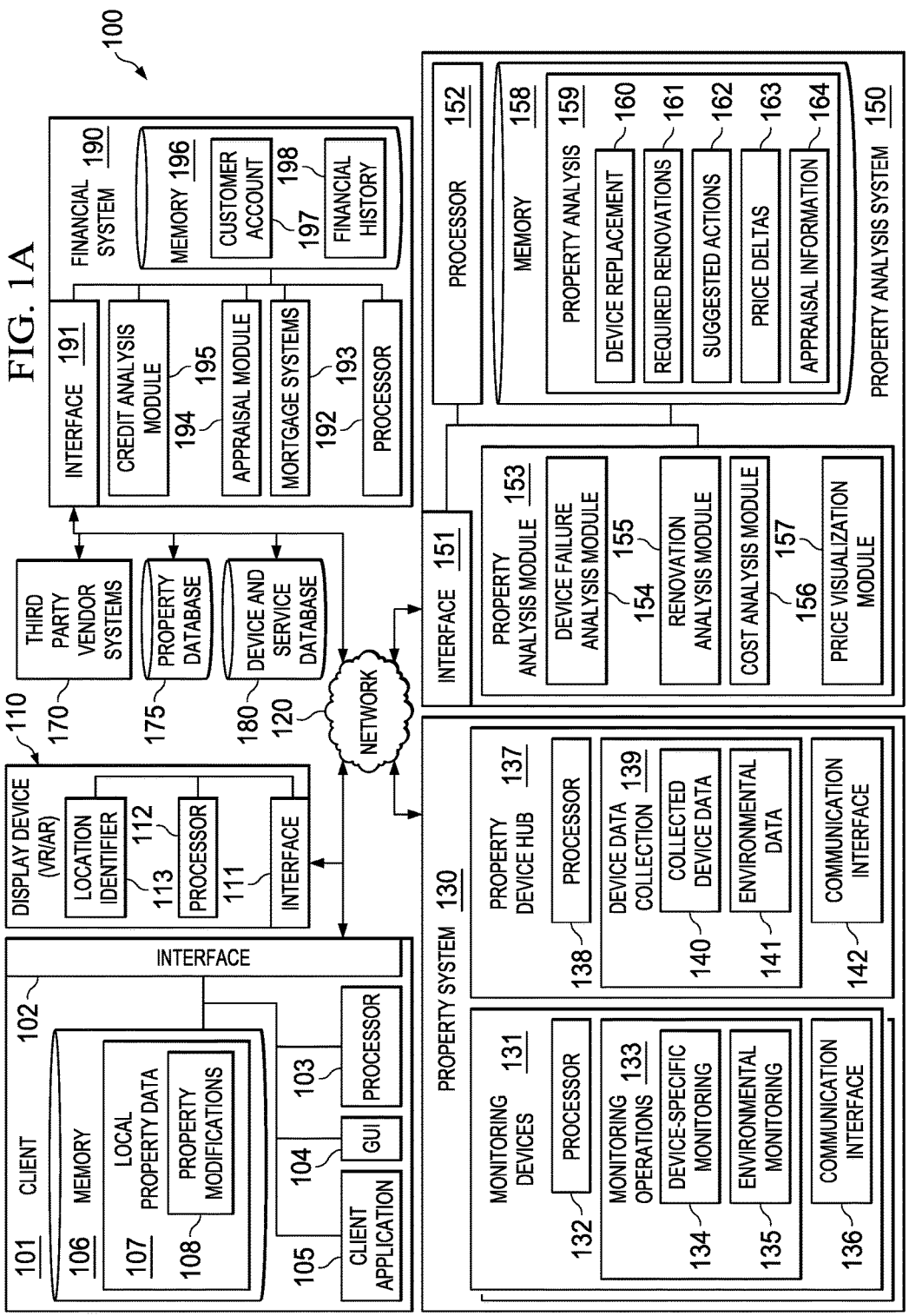
FIGS. 1A and 1B are block diagrams illustrating an example system for performing a connected device-based property evaluation.

The present disclosure describes systems and methods for performing a connected device-based property evaluation. Consumers and real estate purchasers often enter into purchase agreements for real estate without a clear picture of the actual costs involved beyond those of the bare purchase price. In many cases, issues may arise shortly after completing the real estate transaction and occupying the property, such as in a home buying situation. Hidden and unexpected costs associated with the newly acquired property may arise without warning, which can be particularly difficult after the purchasers may have depleted their savings to close the deal. For example, appliances may be near failure or the end of their productive life, air conditioners may be broken or nearing potential issues, leaks or floods in roofs and/or basements may be present but unaccounted for during the purchase process, as well as other possible hidden issues that may be missed by a single inspection visit.

The tools and operations described herein are meant to provide potential purchasers with a clear view of the informed, or modified, price associated with a real estate transaction, where items requiring repair, replacement, or renovation are incorporated as additional line items or information to the purchaser during a property walkthrough, and presented as a complete price during and/or after the walkthrough is complete. The informed or modified price may represent a modified purchase price, a modified appraisal value, a modified selling price, or other suitable modified price as compared to an initial price. A primary example of the modified price is related the change from an initial offer price to purchase a property to a final purchase price, where the final purchase price includes and considers the performance of and costs associated with one or more actions to be taken within a threshold period of time from purchase. However, any other suitable price or value may be used and modified based on the property analysis. Multiple inputs may be used to perform the property evaluation, including connected device inputs monitoring specific device operations and environmental information that can be used to determine one or more issues that may be present. Additionally, information available at the property, such as quick response (QR) tags and/or barcoded information associated with particular devices and locations within the property may be used. Information collected during an inspectors visit may be incorporated into the property evaluation, as well as information provided in public and municipal records, including tax and prior permit records. The information can be used to manually or automatically determine the estimated remaining life or usage time left for particular devices in the property, current conditions in the property that may need to be performed on a short-term basis, and for potential additional costs that may be required. For some implementations, only issues requiring short-term action (e.g., within six months, within a year, etc.) may be considered as a portion of the modified purchase price as calculated. Where such actions are identified, the system can determine costs associated with performing those actions, including the costs to repair, replace, or otherwise renovate one or more device(s) or portions of the property. These costs can be considered in light of their change to the purchase price (e.g., based on revisions to the price to correct the issues), their net cost (e.g., cost to perform the action and the offset based on the change in purchase price) and their change on the potential value of the property (e.g., based on an estimated appraisal in light of the proposed actions).

This information can be added to a presentation generated for a customer, or potential purchaser, during a walkthrough of the property. The walkthrough may be performed in any suitable manner. In the preferred instance, a virtual reality (VR)-based presentation and/or an augmented reality (AR)-based presentation can be provided. In the AR-based presentation, AR lenses or an AR-equipped device (e.g., smartphone, lenses, etc.) can be used during a physical walkthrough of the property at the property's location, where the actions associated with a particular room or portion of the property in which the customer is physically located can be presented for immediate understanding of the proposed action to be performed. In the VR-based presentation, a virtual reality map and walkthrough presentation of the property can be generated, such that suitable VR lenses or VR-based devices can be used to provide a virtual walkthrough of the property, where the actions associated with a particular room or portion of the property in which the customer is virtually located can be presented for immediate understanding of the proposed action to be performed. Alternative types of presentations may also be used, where appropriate, such as video presentations on a standard computer, tablet, or smartphone.

At the end of the walkthrough, the modified purchase price adding each of the individual costs may be presented. In some instances, a running total may be provided to the customer, while in others, the final modified price may be provided only after walking through the property. The modified purchase price can include both the initial price of the property, the costs of performing the determined actions, and a proposed reduction in the initial price to cover or offset at least a portion of the costs required within the threshold timeframe.

The solution described herein can be provided by any suitable provider of financial and real estate solutions, including financial institutions. By closely tying the purchase of real estate property to the financial institution providing the customer with lending support, immediate and/or timely decisions on whether the modified purchase price remains in the affordable and approved ranges for the customer can be incorporated into the process and provided to the customer during the walkthrough and modified purchase price disclosure. Alternatively, other providers of the solution can incorporate the evaluation of a financial institution or institutions to provide additional benefits to customers. By incorporating financial institutions into the modified price determination, the various factors related to a change in the purchase price and the additional ownership costs may be calculated and lending options evaluated, including a combination of two or more types of lending products (e.g., a mortgage for the purchase price of the house and a home equity line of credit for some or all of the repairs, replacement devices, and/or renovation work).

In the described solution, connected devices located at the property may be managed, or may share their information with, a centralized hub. The hub can collect and provide the full or a partial set of the collected information to an analysis system to evaluate the combined data set to identify issues in various locations within the property. In some instances, some or all of the connected devices may be present during the seller's time at the property, while in other instances, some or all of the connected devices may be added just prior to or at the time of selling or otherwise listing the property. The connected devices may be registered with the centralized hub to ensure accurate location-related information of the connected devices, the types of data to be collected, and the length of time data has been collected, among others. In some instances, the connected devices may share their own performance information with the central hub as one source of information on the connected device itself, while in others the connected device may only monitor other devices. In a second implementation, one or more connected, or "smart," devices may monitor a non-connected, or "dumb" device and return information about the performance of the dumb device to the central hub. Algorithms may be known and used to apply information received from one or more monitoring devices regarding the monitored devices to assist in the end-of-life or failure analysis. Where information is obtained from connected devices other than the device itself, users may in some instances need to register those monitoring connected devices with the central hub to ensure that data from the monitoring devices is collected and associated with those devices. The information collected by the devices, and provided to the central hub, can be used by the property analysis system to identify potential issues and generate subsequent imaging and presentations related to the property. In some instances, the devices may be able to share information directly with the property analysis system instead of using a central hub at the property. Other suitable alternatives may also be available.

In some instances, one or more of the monitoring devices may be associated with or may provide location-based services. The location-based services can be used to assist in confirming or validating a specific location of the monitoring device within the property, as well as similar information for the device being monitored. In some instances, an additional device providing location-based services may be associated with a particular monitoring device and/or a monitored component, where the location-based services can be used to identify and verify the location of the corresponding device. This can assist to ensure that no tampering or false data is associated with a monitoring device or monitored device, and that any issues identified by the system are located in the proper place. One example of a device providing location-based services includes a beacon device, which may be placed in the property at any time or which may be included in the monitoring or monitored device. As an example, this can assist in identifying particular devices, components, or infrastructure of the property that are associated with a detected issue. In situations with one or more shared walls with a neighboring property, the location-based information can ensure that the issue is associated with the current property being reviewed. Additionally, the location-based services can be used to ensure that the monitoring devices are not tampered with, by associating the location of an issue with the location of the monitoring devices.

In some instances, information on existing liens on devices, components, or work being done or already performed on the property may be included in the set of information returned to the customer. This information may provide valuable and important information that can avoid potential title and purchasing issues down the buying process. Additionally, rental costs associated with one or more devices or components attached to the property may be included in the analysis and set of information provided to the customer.

Turning to the illustrated embodiment, FIG. 1A is a block diagram illustrating an example system 100 for performing a connected device-based property evaluation. As illustrated in FIG. 1A, system 100 is a client-server and device-client system capable of sharing device-specific and environmental data monitored at or associated with a particular property (i.e., property system 130) to a property analysis system 150. The property analysis system 150 can receive the collected data and use that data to determine one or more potential issues associated with a property to be purchased. In evaluating the received data, the property analysis system 150 can determine a modified purchase price associated with the property based on actions that may need to be taken by the purchaser within a particular timeframe from purchase and those action's associated costs. The modified purchase price may be generated after analyzing the potential issues to be address within the timeframe, identifying one or more actions to be performed to correct those potential issues, and determining estimated costs associated with performing those actions. The property analysis system 150 may also determine a reduced price to be offered to the seller based on the identified issues and the costs associated therewith. The property analysis system 150 may be in communication with a plurality of systems to assist in the analysis. For example, the diagnosis of potential issues and the corrective actions to be taken based on those diagnosed issues may be determined using one or more databases, such as a device and service database 180, which includes information on particular devices and information on costs associated with repairs and replacements for those devices. Additionally, the property analysis system 150 may be in communication with one or more third party vendor systems 170, such as general or subcontractors capable of performing particular installs, renovations, repairs, and other actions as determined by the property analysis system 150. Information on labor rates, parts, supplies, and other information can be accessed from either the third party vendor systems 170 or the device and service database 180 and incorporated into the cost analysis performed by the property analysis system 150. Alternative sources of similar data may also be available and used in various implementations. System 100 includes or is communicably coupled with the client 101, display device 110, property system 130, property analysis system 150, financial system 190, third party vendor systems 170, a property database 175, and a device and service database 180, where these systems are connected, at least in part, by network 120. Although components are shown individually, in some implementations, functionality of two or more components, systems, or servers may be provided by a single component, system, or server. Similarly, in some implementations, the functionality of one illustrated component, system, or server may be provided by multiple components, systems, servers, or combinations thereof. Conversely, multiple components may be combined into a single component, system, or server, where appropriate.

As used in the present disclosure, the term "computer" is intended to encompass any suitable processing device. For example, client 101, property system 130, the property analysis system 150, and the financial system 190, among other illustrated components, may be any computer or processing device such as, for example, a blade server, general-purpose personal computer (PC), Mac®, workstation, UNIX-based workstation, or any other suitable device. Moreover, although FIG. 1A illustrates a single property analysis system 150, property analysis system 150 can be implemented using two or more systems, as well as computers other than servers, including a server pool. Further, while the financial system 190 is illustrated as separate from the property analysis system 150, in some instances the property analysis system 150 may be a part of, integrated with, or otherwise associated with the financial system 190, and vice versa. The present disclosure contemplates computers other than general purpose computers, as well as computers without conventional operating systems. Similarly, the monitoring devices 131 and property device hub 137 illustrated within the property system 130 may be their own computing devices and can receive instructions and/or content from the client 101, the property system 130, and/or the property analysis system 150, or any of the other components while being considered their own computer. Client 101 may be any suitable type of device including a smartphone, tablet, laptop computer, or any other suitable device. The monitoring devices 131 may be directly associated with, embedded within, and/or integral to the property system 130, or they may be separate therefrom. In general, these illustrated components may each be adapted to execute any operating system, including Linux, UNIX, Windows, Mac OS®, Java™, Android™, or iOS. According to one implementation, the illustrated systems may also include or be communicably coupled with a communication server, an e-mail server, a web server, a caching server, a streaming data server, and/or other suitable server or computer.

In general, the property analysis system 150 is used to receive, manage, analyze, and interact with information associated with the property system 130 and, where appropriate, one or more other systems (e.g., financial system 190, the property database 175, the device and service database 180, the third party vendor systems 170, display device 110, and others) to generate, based on the collected input and data, a modified purchase price associated with a particular property. The property analysis system 150 can connect to these various systems via network 120 to obtain information about one or more properties and the status of the devices and environment within or associated with the property, determine actions to be taken based on the identified statuses (e.g., repair, renovate, replace, etc.), determine the estimated costs associated with those actions, and generate a modified purchase price based on the initial price of the property and the adjustments or estimated costs associated with the actions. Once generated, the property analysis system 150 can generate a visualization of the actions needing to be taken within a walkthrough presentation that can allow, for example in augmented or virtual reality, as well as in an online or other presentations, the potential purchaser to view the suggested or necessary actions in the locations within the property where the issues are identified. In some instances, the property analysis system 150 may be associated with and/or integral to the financial system 190, while in others, the property analysis system 150 is separate therefrom. Similarly, one or both of the property database 175 and/or the device and service database 180 may be internal to the property analysis system 150 in some instances.

As illustrated, the property analysis system 150 includes an interface 151, a processor 152, property analysis module 153, and memory 158. The property analysis system 150 may connect directly or indirectly to one or more property systems 130 via a wireless or wired technology (e.g., via network 120, Bluetooth, Near-Field Communications (NFC), etc.), or the property analysis system 150 may contact or interact with one or more application programming interfaces (APIs) associated with one or more of the components within the property systems 130, the financial system 190, repositories 175, 180, and/or the other illustrated components. Where the property analysis system 150 is associated with two or more property systems 130, the property analysis system 150 can maintain separate profiles for each associated property as different property analyses 159.

The interface 151 is used by the property analysis system 150 for communicating with other systems in a distributed environment—including within the environment 100—connected to the network 120, e.g., property systems 130, particular monitoring devices 131 and/or the property device hub 137, clients 101, financial system 190, the databases 175, 180, as well as other systems communicably coupled to the network 120. Generally, the interface 151 comprises logic encoded in software and/or hardware in a suitable combination and operable to communicate with the network 120. More specifically, the interface 151 may comprise software supporting one or more communication protocols associated with communications such that the network 120 or interface's hardware is operable to communicate physical signals within and outside of the illustrated environment 100. Still further, the interface 151 may allow the property analysis system 150 to create ad hoc or dedicated connections to one or more of the clients 101, monitoring devices 131, or property device hubs 137, among others.

Network 120 facilitates wireless or wireline communications between the components of the environment 100 (e.g., between the clients 101 and the property analysis system 150, between the property analysis system 150 and the property system 130, as well as between some or all of the other components illustrated in FIG. 1A), as well as with any other local or remote computer, such as additional clients, servers, or other devices communicably coupled to network 120, including those not illustrated in FIG. 1A. In the illustrated environment, the network 120 is depicted as a single network, but may be comprised of more than one network without departing from the scope of this disclosure, so long as at least a portion of the network 120 may facilitate communications between senders and recipients. In some instances, one or more of the illustrated components (e.g., the property analysis system 150 itself) may be included within network 120 as one or more cloud-based services or operations. The network 120 may be all or a portion of an enterprise or secured network, while in another instance, at least a portion of the network 120 may represent a connection to the Internet. In some instances, a portion of the network 120 may be a virtual private network (VPN). Further, all or a portion of the network 120 can comprise either a wireline or wireless link. Example wireless links may include 802.11a/b/g/n/ac, 802.20, WiMax, LTE, and/or any other appropriate wireless link. In other words, the network 120 encompasses any internal or external network, networks, sub-network, or combination thereof operable to facilitate communications between various computing components inside and outside the illustrated environment 100. The network 120 may communicate, for example, Internet Protocol (IP) packets, Frame Relay frames, Asynchronous Transfer Mode (ATM) cells, voice, video, data, and other suitable information between network addresses. The network 120 may also include one or more local area networks (LANs), radio access networks (RANs), metropolitan area networks (MANs), wide area networks (WANs), all or a portion of the Internet, and/or any other communication system or systems at one or more locations.

As illustrated in FIG. 1A, the property analysis system 150 includes a processor 152. Although illustrated as a single processor 152 in FIG. 1A, two or more processors 152 may be used according to particular needs, desires, or particular implementations of the environment 100. Each processor 152 may be a central processing unit (CPU), an application specific integrated circuit (ASIC), a field-programmable gate array (FPGA), or another suitable component. Generally, the processor 152 executes instructions and manipulates data to perform the operations of the property analysis system 150. Instructions for execution and relevant data may be stored within memory 158 or other local or remote locations. Specifically, the processor 152 executes the algorithms and operations described in the illustrated figures, including the operations performing the functionality associated with the property analysis system 150 generally, as well as the various software modules (e.g., the property analysis module 153 and its device failure analysis module 154, a renovation analysis module 155, a cost analysis module 156, and a modified price visualization module 157), including the functionality for sending communications to and receiving transmissions from the various systems involved in the property evaluation and modified price determinations, as well as in the requests or generation of updated financing information related to the modified price calculations.

As noted, the property analysis system 150 includes the property analysis module 153, where, in the illustrated example, the property analysis module 153 collects and manages the information related to the property analysis and evaluation, including determining the potential actions to be taken and included in the modified purchase price based on the analysis. The property analysis module 153, as illustrated, manages a set of further components that each perform individual portions of the property evaluation, and which share information to provide a full view of the inputs related to the modified purchase price analysis. As illustrated, the property analysis module 153 includes a device failure analysis module 154, a renovation analysis module 155, a cost analysis module 156, and a modified price visualization module 157. As these components may each correspond with one or more external systems, the property analysis module 153, e.g., via interface 151, may provide one or more interfaces allowing communications and exchanges of information with other systems.

In general, the property analysis module 153 represents an application, set of applications, software, software modules, or combination of software and hardware used to manage the property analysis and evaluation for the illustrated system. In the illustrated solution, as described above, the property analysis system 150 is shown as a single system with the property analysis module 153 executing the primary activities thereof. In many implementations, the property analysis system 150 and/or the property analysis module 153 may be a set of related, remote, or individual components used to perform the described functionality of the single system 150 and/or module 153.

Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. In fact, each software component may be fully or partially written or described in any appropriate computer language including C, C++, JavaScript, Java™, Visual Basic, assembler, Perl®, any suitable version of 4GL, as well as others.

The property analysis module 153 may access property-specific information directly from the property system 130 itself, as well as from a property database 175 and/or other suitable locations. An example property system 130 is described below, with data collected from the property system 130 collected at or associated with the corresponding property based on one or more monitoring devices 131. The property database 175 includes a set of property listing 1002 information specific to particular properties. In some instances, the property database 175 may be a centralized database storing particular property information, while in others, the property database 175 may be a collection of linked and/or aggregated data regarding particular properties. In other instances, the information illustrated in the property database 175 may be distributed among a plurality of sources, with no single repository available. Where at least some of the information is stored at the property database 175, the property analysis module 153 can access the property database to obtain property-specific information.

As illustrated, the property database 175 includes a plurality of property listings 1002. In some instances, a property listing 1002 may be generated for or may exist for each property on the market, while in others, only select properties may have property listings 1002 in the property database 175. In some instances, only properties identified by a customer may be added to the property listings 1002. Each property listing 1002 may be associated with varying sets of property-related data, with that data being retrieved from one or more sources. In the illustrated example, the property listing 1002 includes data 1004 obtained from a multiple listing service (MLS) entry for either personal or commercial properties, a private listing for sale, or another realty industry source. The MLS or industry data 1004 may include common information associated with a listed property, including an initial listing price, square footage, information about individual room sizes, appliances, and other listing-related information.

The property database 175 also includes or is connected to a set of municipal data 1006. The municipal data 1006 may include information related to a tax assessor's office, municipal construction permits detailing prior improvements, as well as information on the age and condition of the property as identified by municipal agencies. This information can be used to confirm or identify information about the property and the age of particular devices and construction performed on the property.

The property listing 1002 may also include information on the property's layout 1008. This property layout information 1008 may be used to understand and interpret the location of particular sensors and monitoring devices 131 included within the property, as well as to generate the property walkthrough presentation. The property layout information 1008 may be obtained from a builder, city plans, provided blue prints or layout information, or any other suitable source. The property layout information 1008 may include or be associated with a two- or three-dimensional representation of the property, and can be used by the price visualization module 157 to generate the walkthrough of the property. Additionally, information related to particular devices, sensors, issues, and proposed actions can be associated with particular locations within the property layout information 1008 to allow for accurate walkthroughs to be generated.

The property database 175 may also include information related to a prior or pending property analysis 1010. The property analysis information 1010 can include information on manual inspection data 1012 as performed by a licensed inspector or real estate agent, as well as other notes identified by other inspecting personnel or parties, including disclosures by the seller. Additionally, information on the particular sensors and/or devices 1014 included in the property may be included in the property analysis 1010. This may include both the sensors/devices performing the monitoring (i.e., the monitoring devices 131), but also the specific devices being monitored. Each device or sensor 1014 identified in the property can be stored in the property database 175, where appropriate. The sets of data 1016 collected by the sensor/device 1014 during the monitoring can be included in the data set, as well as monitoring data representing a device-specific analysis 1018 or data set. This may include information captured by a monitoring device 131 of a particular device 1014, or it may include information captured by the monitoring device 131 regarding itself. In some instances, the monitoring devices 131 may provide such information directly to the property database 175, while in other instances, such information may first be provided to the property device hub 137, which can then share the information with the property database 175. In some instances, some or all of the data may be maintained at the property system 130, or instead may be provided directly to the property analysis system 150. Any suitable techniques of making the sensor and device information available to the appropriate systems may be used, including allowing access to stored information directly from the property system 130, from a centralized or remote location such as the property database, or by directly sending results of the monitoring by the devices to the property analysis system 150, among others.

The property analysis 1010 may also include information on particular environmental data and analysis 1020 as captured by the monitoring devices 131. In some instances, one or more results from the environmental analysis may be determined and stored in the property database 175 (or another suitable location) and used in the modified price and estimated costs calculations.

Pending and/or completed analysis results 1022 may be stored and made available in the property database 175. The analysis results 1022 may include individual decisions and determinations relating to particular devices, locations within the property, and other actions to be taken or recommended to be taken at the property. These results 1022 may be updated as additional information and calculations/determinations are performed. Similar to the captured data, the analysis results 1022 may be stored or maintained at any suitable location or component, and the illustration of the results 1022 in the property database 175 are not meant to be limiting.

The illustrated property database 175 includes a set of modified price results 1024 upon completion of the modified price analysis. The modified price results 1024 may include location-by-location actions to be taken within the property, as well as the costs associated with those actions. In some instances, the modified price results 1024 may include information on and/or an option to tear down and rebuild at least a portion of the property, including the associated costs and pricing analysis of the same. The tear down and rebuilding related actions may be included in identified renovation actions and corresponding pricing analyses. Additionally, if a lower purchase price is calculated or suggested based on the identified actions, the results can be included in the modified purchase price results. The results of the analysis performed by the property analysis system 150 may be stored at the property database 175, or, instead, may be stored at the property analysis system 150.

Returning to the property analysis system 150, the device failure analysis module 154 reviews information collected from one or more monitoring devices 131 located at or associated with a particular property and included within the property system 130. Using this information, as well as information obtained from the device and service database 180 and the property database 175, the device failure analysis module 154 can determine a potential or likely lifespan or expected failure of one or more devices associated with the property. In addition to particular devices, information captured by the one or more monitoring devices 131 can be used to identify issues and/or potential problems based on environmental readings and data collected at the property. Such information can be used to derive one or more additional issues or potential repairs or other actions that may need to be taken at the identified property, including those not directly related to a particular device. For example, environmental information identifying a higher than expected humidity in a room or location of the property may result in a need to replace dry wall, wiring, windows, or other portions of that location. With regard to particular devices, monitored operations of particular devices from the monitoring devices 131, independent of or in combination with information regarding the age of the corresponding monitored device, may be combined, along with other relevant information collected at the property, into an analysis to determine whether one or more of those devices is nearing the end of its expected lifespan or is nearing a failure. While some or all of the information may be available locally at memory 158, the device failure analysis module 154 can use interface 151 or a device-specific interface (not shown) to retrieve and/or obtain additional information regarding the property.

The device failure analysis module 154, for example, can obtain, inspect, and analyze the collected information in light of information obtained from a device and service database 180. The device and service database 180 (illustrated in FIG. 1B) can store and maintain information related to a plurality of various devices, as well as on information related to renovations, service, and costs. With regard to particular devices, the device and service database 180 can include any number of data points associated with a plurality of devices 1050. Each device 1050 may have an entry where device-specific information is maintained, such as in a database or other structured format. Alternatively, each device's entry may include a plurality of links to device-specific information stored in any suitable location, including web sites and/or commercial databases. Particular devices 1050 may be associated with their specific device identifiers 1052, where the device identifier 1052 may include a model number or other uniquely identifying set of information. In addition to the device identifier 1052, the devices 1050 may be associated with and/or linked to a set of manufacturer information, including expected performance data 1054 and projected failure and troubleshooting data 1056.

The expected performance data 1054 may include standard performance data from the manufacturer, as well as information obtained from one or more other users or entities having experience with the device 1050, including technicians, owners, and others. Deviations from the expected performance data 1054 may be analyzed by the device failure analysis module 154 to determine and identify a potential lifespan remaining for the monitored device associated with the property system 130. In some cases, an expected lifespan of the device 1050 may be included in the expected performance data 1054, where the expected lifespan is a theoretical expected lifespan based on a normal or standard usage patterns, where the usage patterns are identified for comparison with the specified device.

Each device 1050 may be associated with a set of projected failure and troubleshooting data 1056. The projected failure and troubleshooting data 1056 may include information related to common fixes, corrections, and lifespan-sustaining operations that may be experienced or used during operation and usage of the device 1050. This data 1056 may be provided by the manufacturer in some cases, as well as by a collected knowledge base provided by other users, technicians, and repair workers, among others. The device failure analysis module 154 and similar components may access and interpret the troubleshooting information to determine how and if a particular issue can be corrected and/or fixed to allow for repairing of the device 1050 if similar issues are faced. Additionally, information about whether a particular issue is indicative of a projected failure or whether particular metrics are signs of an impending failure may be included in this data. Using this information, the projected lifespan or time to failure can be determined by the device failure analysis module 154.

Additional information stored on the device and service database 180 related to each device 1050 not illustrated herein may include maintenance information schedules, device-related experiential data, and other information. The maintenance information may be used to compare maintenance performed on particular devices with the recommended and/or required maintenance. The device-related experiential data can include information and additional data of experiences seen by one or more other users, including records and information associated with failures of other devices of the same type. In some instances, the information may be manually entered by the other users, the manufacturer, repair technicians, or other individuals. Alternatively, at least some of the information may be automatically entered based on detected issues or readings in smart systems, including from one or more monitoring devices 131 from other property systems 130 as well as elsewhere. In some instances, the device-related experiential data may include a set of actual product performance data, including information on the actual life span seen or obtained by others. The actual product performance data may differ from the expected performance data 1054, or may be a part of the expected performance data 1054, and may reflect, in some cases, a more accurate estimation of actual lifespans to be expected. In some instances, the actual product performance data may include information on the operating environment of the particular devices 1050 for which a particular set of actual data was captured, where that information can be compared to the environment in the property system 130 to modify or update a failure analysis or end of life estimate. The device-related experiential data also include actual failure data, which can provide information on various device failures experienced by other users or entities. For example, if a particular error is constantly seen prior to a device failure, the actual failure data may include such information, where the device failure analysis module 154 can determine if the particular device at the property system 130 is experiencing similar issues.

As illustrated, the device and service database 180 includes additional information related to replacement costs information 1058, repair cost information 1060, and alternative device options 1062. The replacement cost information 1058 can include current or projected pricing to perform a full replacement of a particular device 1050, while the repair cost information 1060 may be current or projected costs to repair the device 1050 in response to certain identified issues. The alternative device options 1062 may include links to and pricing related to optional replacement devices. The alternative device options 1062 may be provided or used when the device 1050 is older and/or obsolete, when the costs of obtaining the device 1050 are more than a particular alternative option, or where the functionality of the alternative device options 1062 significantly exceed the functionality of the device 1050 such that purchase and operational costs associated with the alternative device option 1062 are less than or near the costs associated with the device 1050. In some cases, the alternative device options 1062 may be based on the demographics of the customer, including what similarly situated individuals, companies, or entities chose to purchase instead of the device 1050. These sets of cost information may be applied by the cost analysis module 156, described below.

The device and service database 180 may also include a set of renovation and service information 1070 related to the costs of particular renovations, repairs, and other services identified as being needed. For example, the renovation and service information 1070 may include local provider listings 1072 identifying particular providers within a serviceable area of the property. Those providers may be specialists related to particular work or renovations, device-specific providers or repair persons, or general contractors, among others. In some instances, these providers may provide information 1074 about the type of renovations and/or other services (e.g., repair services) provided, as well as the typical costs 1076 for particular types and sizes of renovations, repairs, and other service. This information may be used by the property analysis system 150 and its components to calculate labor costs associated with particular actions, including replacement of devices, as well as other work to be performed at the property, including non-device-related work, such as electrical or mechanical maintenance, renovation, and repair.

While the device and service database 180 is illustrated as separate from the other components, the database 180 may be a part of or implemented within one of the other components or in another location as appropriate in alternative implementations. Further, a subset of the information in the illustrated database 180 may be available in alternative implementations, as well as alternative and/or additional information or data. In some instances, the database 180 may be stored as a cloud-based directory or database, and can allow access by multiple different components via network 120. Still further, the database 180 may be maintained at or by the property analysis system 150 in some instances, as well as by the financial system 190 in others.

In some instances, the property analysis system 150 may access one or more third party vendor systems 170 to perform price checks, request and receive quotes for replacement devices, repair work, and renovation estimates, and generally identify additional cost estimates and information. The third party vendor systems 170 may be associated with retailers, installers, contractors, and other entities having available cost estimates for work to be performed and/or devices and other items to be purchased. These systems may be updated or may include information outside or apart from the device and service database 180, and may provide alternate or additional cost estimates to be included in the cost analysis process.

Returning to FIG. 1A, the device failure analysis module 154, as well as the property analysis module 153 itself, may use any suitable interface, e.g., interface 151, to access and interact with information at any of the corresponding components or systems. In some instances, portions of the analysis performed by the components may be sent to or executed at one of the corresponding systems. For example, a financial analysis related to a property may be performed at the financial system 190 with the results returned to the property analysis system 150 and incorporated into the execution of the full analysis process.

In general, the illustrated modules of the property analysis module 153 may be combined into a single application or module in some instances. As noted, some of the property analysis module 153 may be located or available at one or more remote systems, including a portion of the property system 130 or the financial system 190, among others.

The second illustrated component in the property analysis module 150 is the renovation analysis module 155. The renovation analysis module 155 provides an analysis similar or analogous to the device failure analysis module 154, but instead of relating to a specific device or set of devices, the renovation analysis is based on particular additions to or repairs of the structure of the property itself. For example, the renovation analysis module 155 may perform its analysis based on information identified from the monitoring devices 131 related to a particular renovation project to be performed, such as replacing wiring, fixing or replacing walls, or building out an area to add or change an existing layout or design. In some instances, the monitoring devices 131 may provide environmental data indicating water damage, weak structural support, or other issues that require repair and/or renovation to the structure. The renovation analysis module 155 can interpret the monitored data to identify one or more actions required for a particular location associated with the captured data. In some instances, the device and service database 180 may include environmental factors and information that can be used to determine when such repairs and renovations are required. In those instances, the renovation analysis module 155 can compare the captured data to the environmental factors associated with those issues to determine particular fixes to be used for the repair or renovation. In addition to data from the monitoring devices 131, the renovation analysis module 155 may be able to interpret other information about the property to determine if potential actions should be taken. For example, information about a property build date and relative location may indicate or suggest that asbestos or lead paint were present when the property was built. A subsequent comparison to municipal data 1006 may indicate that no prior removal of the identified conditions have been performed. In those instances, the renovation analysis module 155 may determine that removal of the asbestos or lead paint is needed, and include that into the modified price analysis.

In some instances, one or more renovations or repairs may be specifically specified by the customer prior to requesting or initiating the modified price analysis. In those cases, the renovation analysis module 155 can include such actions in its modified price calculations. Alternatively, manual inspection data 1012 may be used by the renovation analysis module 155 to determine additional work that may need to be performed.

In general, the renovation analysis module 155 may only view issues that require a solution within a threshold period of time after purchase, such as six months to a year post-purchase. The evaluation of those renovations and repairs may be based on the severity of the issue, the costs associated with the issue not being corrected, and the input of the customer (for items specifically identified). In some instances, the threshold period may be weighted differently or modified where the potential severity of the issue greatly outweighs the likely timeline of a required repair. For example, excess humidity in a location may result in mold, insects, or other major issues with the property. A potential evaluation of a major issue occurring in 18 months as opposed to 12 may be included within the items for the modified purchase price evaluation due to the severity of the problems occurring due to the issue even though the issue may be farther out than the standard evaluation. Similar adjustments may be made for particular device-related issues, such as large appliance and/or HVAC issues that may be associated with relatively larger than normal costs.

Once the particular issues and items to be included in the modified purchase price evaluation of the device failure analysis module 154 and renovation analysis module 155 are identified, the cost analysis module 156 calculates estimated costs associated with each identified issue. As noted, both the device failure analysis module 154 and renovation analysis module 155 may output a set of issues to be addressed, including proposed solutions or actions to be taken to remedy those issues. The cost analysis module 156 performs an automated analysis of the costs associated with the proposed solutions or actions. For device-related actions, the replacement cost information 1058, repair cost information 1060, and alternative device options 1062 may be consulted and analyzed. Similarly, for renovation and repair to the structure, information on particular providers from the provider listings 1072 may be searched to determine costs 1076 associated with different renovation and repair types. In some instances, the cost analysis module 156 may perform an analysis to determine a potential reduction in the actual purchase price of the property. This information may be performed by an appraiser or automated appraisal system, such as appraisal module 194 of the financial system 190. Information on the property along with the issues may be provided to the appraisal system, where changes to the appraised price may be determined. The changes to the initial price may then be included in the cost analysis by the cost analysis module 156 and included in the modified purchase price evaluation, including an evaluation by the financial system 190 as to whether financing based on the modified price may be approved. The initial price may be a price determined by a realtor or selling party using professional knowledge to set an initial sale or proposed sale price. Alternatively, the initial price may be an initial appraisal value or other calculated price from a particular professional, person, or other entity. In some instances, the informed, modified or revised price is then a calculated price revised based on the cost analysis operations and determinations, where the modified price may reflect a more accurate estimated cost for potential purchasers, realtors, or other parties based on the work and actions to be performed.

Each of the issues and actions identified by the device failure analysis module 154 and the renovation analysis module 155 can be associated with a particular location within the property. Using this location data, the actions to be performed can be associated with the corresponding location within the property (including based on property layout information 1008 in the property database 175), such that walkthrough presentation can associate those actions and their estimated costs to the particular location. For example, when the presentation determines that the customer is located in a first room of the property, either virtually or physically, the actions associated with components or structural issues in that same room may be presented at that time.

The price visualization module 157 is a component used to generate the corresponding property walkthrough based on the modified price analysis. As noted, the walkthrough may be presented as an AR presentation, a VR presentation, or an online presentation. The price visualization module 157 can take the identified actions and generate notifications, cost information, and issue information into a presentation to be viewed when interacting with the walkthrough. As the actions to be taken are connected to or related to particular locations within the property, the price visualization module 157 connects those locations within the presentation such that location-relevant information is presented when the customer is in the corresponding location during the walkthrough. In an AR presentation, the price visualization module 157 can identify coordinates or reference points within the corresponding location so that an augmented reality image or data presentation is provided to the person as they reach the actual physical location. In those instances, the data may be presented as an overlay to show an area or device associated with the issue for the current location, as well as the costs associated with correcting the identified issue. In some instances, where one or more options exist, the module 157 can include one or more options to be selected by the customer during the walkthrough (e.g., repair the device or replace the device). Using inputs from the AR device 110, the customer can select an appropriate action and the modified price can be updated accordingly. In a VR presentation, the price visualization module 157 can generate a virtual representation of the property and associate, within the virtual representation, coordinates or reference points within the corresponding virtual location so that a virtual image or data presentation is provided along with the virtual representation of the location as they reach the virtual location during the walkthrough. Still further, online presentations may be generated by the price visualization module 157, where customers can view the property through an online walkthrough using pictures of the property that are annotated with information on the actions required or suggested to be performed. The walkthrough can be clicked or otherwise navigated through to view the various points of interest and potential actions that may affect the modified purchase price.

The illustrated property analysis system 150 also includes memory 158, or multiple memories 158. The memory 158 may include any memory or database module(s) and may take the form of volatile or non-volatile memory including, without limitation, magnetic media, optical media, random access memory (RAM), read-only memory (ROM), removable media, or any other suitable local or remote memory component. The memory 158 may store various objects or data, including financial data, user information, administrative settings, password information, caches, applications, backup data, repositories storing business and/or dynamic information, and any other appropriate information including any parameters, variables, algorithms, instructions, rules, constraints, or references thereto associated with the purposes of the property analysis system 150. Additionally, the memory 158 may store any other appropriate data, such as VPN applications, firmware logs and policies, firewall policies, a security or access log, print or other reporting files, as well as others. For example, memory 158 can store property analysis information 159, including information relevant to particular analyses.

The property analysis 159 included in memory 158 may be similar or different to the property analysis 1010 stored in the property database 175. In some instances, the information may only be stored in one of the locations. Further, in some instances the information stored in the property analysis 159 of memory 158 may include a subset of information included in the property database 175. The information may be connected, or may represent particular instances of the information stored in property database 175. In any implementation, information related to particular property analyses can be made available to the components of the property analysis system 150.

As illustrated, the property analysis 159 includes information on suggested and/or required actions to be taken based on the completed or on-going property analysis, including one or more device replacements and repairs 160, required renovations 161, and suggested actions 162 (e.g., those that are suggested and not required, or where multiple options are available and require customer input). Additionally, one or more price deltas 163 associated with particular actions may be included in the property analysis 159. For example, information on a suggested modified offer price based on the actions to be taken may be included with the price delta 163, as well as the calculated prices associated with the required and suggested actions that make up the modified price calculation. Copies of appraisal information 164 may be available that relate to the property, including appraisal information 164 that relates to the initially appraised value of the property before the property analysis, an appraised value based on the identified issues, and an estimated appraised value of the property based on the proposed and suggested actions to be taken. The values of these appraisals may be used by the cost analysis module 156 to generate revised offer prices and information associated with the modified price of the property. In some instances, price deltas 163 may be determined or occur by combining actions. For example, the price delta 163 may be lower, or the overall costs may be less, to change or replace an HVAC system where the drywall or related components/devices are also to be replaced. Similar related activities may result in a beneficial pairing, particularly when actions associated with one device or component may be related to actions to be taken with another device.

The property system 130, as illustrated, represents any property-based or -related ecosystem or environment where at least one monitoring device 131 monitors device statuses and environmental statuses at an identified property. In particular, the property system 130 may represent a set of connected devices existing at a property, where the connected devices, or monitoring devices 131, are used to monitor the property for purposes of the property analysis. In some instances, the property analysis system 150 may be physically located at or near the property system 130, such as running on a computer or other device within the property. In other instances, the property analysis system 150 may be remotely located from the property system 130, including when the property analysis system 150 is implemented as a cloud-based system. Alternatively, a remote component of the property analysis system 150 may be present at the property system 130, and may provide some or all of the information collected by the monitoring devices 131 to the property analysis system 150 for review.

As illustrated in FIG. 1A, the property system 130 includes one or more monitoring devices 131 and a property device hub 137. Alternative implementations may include additional or alternative components. For example, the display device 110 may be included in or associated with the property system 130 in some instances. Additionally, the property system 130 may include an internal network or communications system that allow the devices to interact and correspond with one another. The property system 130, or portions thereof, may provide on-going monitoring of the property over the course of ownership prior to a sales event, or monitoring on a limited basis in response to the sales event. In some instances, some portions of the property system 130 may monitor the property on an ongoing basis while additional components are added in anticipation of the sales event.

The monitoring devices 131 represent one or more connected devices in the property system 130 that are used to monitor the operations of at least one device (connected or non-connected) or an environmental aspect of the property. In some instances, a particular monitoring device 131 may itself be monitored, either by the same monitoring device 131 or by another monitoring device 131. In some instances, a monitoring device 131 may collect information on its own operations and another device's operations. Information about a single device may be received from multiple monitoring devices 131, including the single device itself in some instances. The monitoring devices 131 can monitor other devices at the property and, optionally, connected to the property system 130, for potential failures and end-of-life calculations. Additionally, as noted, the monitoring devices 131 can capture environmental data that may be associated with a particular device or a general current status or state of the property. In particular, a monitoring device 131 may be able to provide smart-functionality to a particular "dumb" device being monitored, or may provide additional "smart" functionality (e.g. one or more sensors and/or other data capturing abilities) to an existing smart device that is monitored. For example, additional environmental information and/or monitored device performance results may be captured externally by the monitoring device 131 than can be captured by the device being monitored itself. At least some of the information that can be captured by the monitoring device 131 can be provided to the property analysis module 153, and in particular, one or both of the device failure analysis module 154 and/or the renovation analysis module 155.

As illustrated, an example monitoring device 131 can include a processor 132, a set of monitoring operations 133, and a communications interface 136. Processor 132 may be similar to processor 152, and may perform and execute the various operations of the particular monitored device 131. For example, where the monitoring device 131 performs a non-monitoring function, the standard operating operations may be executed by the processor 132. Those operations may include the specific actions or standard operating operations (not illustrated) performed by the monitoring device 131, such as when the monitoring device 131 is a smart device that performs operations within the property. For example, the monitoring device 131 may be a smart thermostat, where the monitoring device 131 can be used to manage and operate an HVAC unit within the property.

Where monitoring functions are to be performed, the processor 132 can perform those operations 133. The monitoring operations 133 can include device-specific monitoring operations 134 as well as environmental monitoring 135. The device-specific monitoring operations 134 can be monitoring operations specifically associated with the operations of a monitored device. For example, an amount of electricity used by the monitored device may be monitored, as well as run time, current settings, or other suitable parameters. In contrast, the environmental monitoring operations 135 may include monitored environmental factors that may relate, either directly or indirectly, to one or more monitored devices, as well as to a structural or functionality portion of the property. For example, if the device being specifically monitored is an HVAC system, the environmental factors associated with the HVAC system may be a temperature or humidity in the associated location. The device failure analysis module 154, knowing the location of the monitoring device 131 and the devices being monitored in a particular property system 130, can use the device-specific monitoring data and the environmental monitoring data and use that data to assist in the failure analysis process. Similarly, environmental monitoring 135 can be used to identify structural and/or other issues associated with a particular location in the property. The monitoring devices 131 may be associated with a particular location within the property, thereby allowing location-based observations to be traced and used in both the device failure analysis and the renovation and repair analysis. In other words, when monitoring from one or more devices in a location indicate a potential issue, the issue can be associated with the particular location and can be linked to that location when a later walkthrough presentation is generated. This location-based information can also assist when a potential structural issue is identified due to environmental monitoring 135 or based on derivations from device-specific monitoring 134, particularly where the structural issue is not associated directly with a device. The issue can be pinpointed and evaluated based on its location.

In some instances, the environmental monitoring operations 135 may include a long-term environmental monitoring of the property by one or more monitoring devices 131. The long-term environmental monitoring can assist in identifying long-term issues and problems associated with the property, if any exist. For example, if a property has sustained, over an extended period of time, high humidity, chances of a potential mold development or other humidity-related issues may have occurred. Where no specific evidence of an issue based on the long-term monitoring is identified, suggestions to customers and other interested users related to the potential issue may be generated. In the high humidity situation, for example, suggestions to perform a mold and/or air quality test may be presented, along with the costs for such tests. In some instances, costs for such inspections may be presented or highlighted before purchase and/or factored into the modified purchase price.

Similarly, combinations of environmental monitoring results and device monitoring results may be combined to monitor and identify potential issues. Returning to the example of sustained high humidity, additional device-related monitoring may identify high sustained electricity costs over a similar period of time. In some instances, such determinations may suggest a negative indicator related to the property, such as an indoor farming or horticultural activities. These determinations, as well as other combinations of device-related monitoring results and environmental monitoring information, can assist in identifying potential issues and costs to be considered.

As illustrated, the monitoring devices 131 may also include a communication interface 136 to communicate with other devices 131, a property device hub 137, the property analysis system 150, and/or any other suitable system or component.

In one instance, some or all of the monitoring devices 131 may be present at a property and included within the property system 130 prior to placing the property for sale or otherwise making the property available. In those instances, some or all of the monitoring devices 131 may be able to provide historical monitoring data in addition to current monitoring data. In other instances, one or more of the monitoring devices 131 may be added to the property system 130 prior to, during, or upon listing a property for sale. Alternatively, one or more of the monitoring devices 131 may be added to the property system 130 after a particular customer associated with the property analysis system 150 indicates his or her interest in a particular property. The monitoring devices 131 may be placed by an entity (e.g., a real estate agent or company) or financial institution for performing the analysis to assist their potential clients.

Some or all of the monitoring devices 131 may include built-in or add-on tamper detection mechanisms. Such tamper detection can ensure against or provide notice of potential tampering with the readings and monitoring operations 133 of the devices 131. The tamper detection mechanisms may be hardware or software-based, as well as a combination thereof. The mechanisms may detect and/or stop physical attempts at intrusion or attempts to modify the physical monitoring of the devices 131. Alternatively or additionally, the mechanisms may be able to detect and stop software- or firmware-based attempts to hack, modify, or interfere with the devices 131 operations. In addition to preventing fraud on the monitoring operations, the tamper detection can increase user confidence of the seller's description of the property and confirm the accuracy of the property evaluations.

The property device hub 137 of the property system 130 may be a component used to manage the collection of data and information as captured by the monitoring devices 131. The property device hub 137 may be optional, and can provide assistance and management in setting up and collecting one or more of the monitoring devices 131. Information captured by the monitoring devices 131 can be provided to the property device hub 137, which can then provide the captured information to one or more systems or components via network 120, including the property analysis system 150 or property database 175, among others. In some instances, the property device hub 137 may store both information on the collected data as well as location information for particular monitoring devices 131.

The property device hub 137, as illustrated, includes a processor 138, a collection of device data 139, and a communication interface 142. Processor 138 may be similar to processor 132, and may perform and execute the various operations of the property device hub 137. In some instances, the property device hub 137 may also be a monitoring device 131, and may perform similar operations as described above. As illustrated, the property device hub 137 includes a collection of device data 139, which can include collected device data 140 and environmental data 141. The collected data can be associated with particular monitoring devices 131 and their associated locations within the property, thereby allowing the identified issues to be suitable located within the property for later walkthrough presentations. The property device hub 137 also includes communication interface 142 used to communicate with the monitoring devices 131, the property analysis system 150, and/or any other suitable system or component. In some instances, the property device hub 137 may be a remote module or component of the property analysis system 150 used to send collected data to the property analysis system 150 in a coordinated manner as opposed to receiving data from multiple monitoring devices 131. In other alternatives, the monitoring devices 131 and/or the property device hub 137 may send collected data to the property database 175 for centralized storage and usage.

Illustrated environment 100 includes client 101 associated with the customer. The customer may use the client 101 to monitor listings of potential properties and to identify one or more properties upon which a property analysis is to be performed. Additionally, the customer may identify one or more specific improvements or modifications (i.e., renovations or device replacements) to be performed on a particular property, such that those particular improvements can be included and considered in the property analysis, particularly where the improvements or modifications are not otherwise determined to be required during the analysis.

The illustrated client 101 is intended to encompass any computing device such as a desktop computer, laptop/notebook computer, mobile device, smartphone, personal data assistant (PDA), tablet computing device, one or more processors within these devices, or any other suitable processing device. For example, the client 101 may comprise a computer that includes an input device, such as a keypad, touch screen, or other device that can accept property selections and improvement/modification information, and an output device that conveys information associated with the operation of the client application 105 or the client 101 itself, including digital data, visual information, or a GUI 104, as shown with respect to the client 101. Specifically, the client 101 may be any computing device operable to connect to or communicate with the property analysis system 150, other clients 101, the financial system 190, and/or other components via network 120, as well as the with the network 120 itself, using a wireline or wireless connection. In general, client 101 comprises an electronic computer device operable to receive, transmit, process, and store any appropriate data associated with the environment 100 of FIG. 1A.

In particular, client 101 executes one or more client applications 105. In some instances, at least one of the client applications 105 may be used to correspond with the property analysis system 150 to identify one or more properties for which a property analysis and modified price evaluation should be performed.

As illustrated, client 101 includes an interface 102, a processor 103, a graphical user interface (GUI) 104, a client application 105, and memory 106. The interface 102 and processor 103 may be similar to or different than interface 151 and processors 152, 132, and 138. In general, processor 103 executes instructions and manipulates data to perform the operations of the client 101. Specifically, the processor 103 executes the algorithms and operations described in the illustrated figures and associated with the client 101, including the operations performing the functionality associated with the client application 105. Memory 106 may be similar to or different than memory 158. While illustrated generally, memory 106 may store or maintain information related to one or more local properties, including local property data 107. This may include one or more properties that the customer has shown interest in with relation to the property analysis. Such properties may be viewed via the client application 105, which may be a web application, desktop application, portal page or portal-based application or process, a dedicated mobile application, or other software, including a specific application or component associated with the property analysis system 150, in some instances. The client application 105 may allow the customer to identify particular properties for purchase or inspection and to identify on which of those properties to obtain additional information. Client application 105 may be a web application, desktop application, portal page or portal-based application or process, a dedicated mobile application, or other software. In some instances, the client application 105 may be used to view an online walkthrough presentation associated with a particular property based on the modified price analysis. In some instances, the local property data 107 may include at least one property modification 108 identified by the customer. Each property modification 108 may be an optional action, or customer-specified renovation or replacement that is not based on the relative lifespan or failure of a device or portion of the infrastructure, but is instead a personal or optional modification that will be performed if the purchase is finalized and should be included in the modified price analysis.

GUI 104 of the client 101 interfaces with at least a portion of the environment 100 for any suitable purpose, including generating a visual representation of a Web browser and/or the client 101. In particular, the GUI 104 may be used to view and navigate various Web pages located both internally and externally to environment 100, as well as to view and navigate through information accessed by the client application 105, such as information associated with one or more properties. Generally, the GUI 104 provides the customer with an efficient and user-friendly presentation of data provided by or communicated within the system. The GUI 104 may comprise a plurality of customizable frames or views having interactive fields, pull-down lists, and buttons operated by the user. For example, the GUI 104 may provide interactive elements that allow a user to view or interact with information related to the operations of the process associated with the property analysis process. The GUI 104 may present information associated with the client application 105, as well as the property system 130 and/or the property analysis system 150. In general, the GUI 104 is often configurable, supports a combination of tables and graphs (bar, line, pie, status dials, etc.), and is able to build real-time portals and presentations, where tabs are delineated by key characteristics (e.g., site or micro-site). Therefore, the GUI 104 contemplates any suitable graphical user interface, such as a combination of a generic web browser, intelligent engine, and command line interface (CLI) that processes information in the platform and efficiently presents the results to the user visually.

The display device 110 may be any suitable device capable of presenting an augmented or virtual reality presentation to a user, and in particular, an augmented or virtual reality walkthrough presentation associated with a property having been evaluated using the modified price analysis. Augmented reality devices blend a view of a virtual presentation with a real-life or live presentation of information. One example of such augmented reality device is Google Glass and other wearable technology using an optical head-mounted display. With augmented reality, users are able to interact with virtual contents in the real word and can, in most cases, distinguish between real and virtual contents. Another example of augmented reality can be realized in smart devices, such as a smartphone or tablet with a camera. While presenting images on the screen captured by the camera of the device, augmented reality devices or functionality may present additional virtual elements within the otherwise real-world display, enhancing or modifying the images shown on the display. Virtual reality devices traditionally isolate the user from the real world, presenting a visual display that is completely computer generated. Virtual reality devices include virtual reality helmets or goggles, such as the Oculus Rift. The particular AR/VR device 110 used in particular implementations may vary based on the particular implementation, although suitable property walkthrough presentations can be generated, e.g., by the price visualization module 157. In some cases, the display device 110 may be associated with or incorporated into the client 101. For instance, the display device 110 may be associated with a mobile application on a mobile device, where, by using the camera of the device and the associated GUI, an augmented reality version of the walkthrough can be presented. This can allow customers an easy and non-device-specific means for performing the walkthrough using a common device. In other instances, realtors, lenders, and others associated with the property analysis may supply suitable display devices 110 for viewing the walkthrough presentation.

In some instances, the display device 110 may include interface 111, as well as one or more inputs that allow the customer to interact with the presentation and provide feedback or information to the property analysis system 150. For example, verbal or touch inputs may be received by the display device 110 from the customer during presentation of the walkthrough, such as when options related to the walkthrough and modified price are presented to the customer or other user. In response to these inputs, the interface 111 may relay those communications to the appropriate system and update the presentation. The interface 111 can also communicate with one or more other components in environment 100, as appropriate.

In some instances, the display device 110 may include a processor 112 (similar to or different from the other described processors) used to execute the functionality of the display device 110. The processor 112 can execute a program or application for presenting the property walkthrough, as well as perform other operations and functionality of the display device 110. As illustrated, the display device 110 may include a location identifier 113. The location identifier 113 may be a program, application, or module that assists in locating the display device 110 where the display device 110 is capable of augmented reality presentations. The location determined may be an absolute location (e.g., based on GPS signals) or relative to a particular sensor or device within the property. The location identifier 113 can provide feedback to the price visualization module 157 (when the module 157 streams the presentation) or to the application executing the presentation to identify where in the property the customer is currently located, so that proper information, issues, and costing information is available and augmented in the display accordingly. Any suitable location identifier 113 may be used. Such a location identifier 113 may not be needed in virtual reality implementations, as the presentation may be wholly virtual without the need to physically be at the actual property location. However, the location identifier 113 may be used to provide a virtual location within property based on input from the customer, such that the presentation can be provided to the current virtual location of the customer. As noted, the walkthrough presentation may be streamed from the property analysis system 150, the property database 175, or from any suitable location. In other instances, the display device 110 may include a local version of the presentation in memory (not shown). In some instances, the display device 110 may be capable of receiving input from the customer during the walkthrough. In particular, should the customer identify a renovation or other optional action during the walkthrough, the customer may submit the action via the display device 110 (or another suitable input device) to have the submitted action included in the property analysis. For example, the customer may identify interior painting that should be done, or selects one or more appliances to be replaced. In some instances, the presentation may be dynamically updated such that the action is associated with the appropriate location, an estimated cost is identified, and the price is updated.

As illustrated, environment 100 includes the financial system 190. The illustrated financial system 190 represents a system where customer-specific financial information related to the property and modified price evaluation can be obtained, and where determinations as to whether a mortgage or other lending options associated with the property can be approved based on the determined modified price. In some instances, some or a portion of the property analysis system 150 may be located at or associated with the financial system 190. Other portions of illustrated environment 100, such as a part or all of the property database 175 and/or the device and service database 180 may be stored at, associated with, or otherwise related to the financial system 190. As illustrated in FIG. 1A, the financial system 190 can receive information from and share information with any, all, or a subset of the other illustrated components via network 120. In some instances, the financial system 190 may be associated with a particular financial institution, such as a bank, credit union, peer-to-peer lending or crowdfunding entity, or any other suitable lending-based institution or entity.

The financial system 190 may be a lender of the customer, or a lender prepared to offer lending assistance to the customer for a particular property associated with the property analysis. In the current example, the financial system 190 may be associated with the offer of a mortgage for purchase of the identified property, as well as appraisal services associated with securing the mortgage. The financial system 190 may be involved in all aspects of the property analysis, or only the financial and lending portions thereof. Alternatively, different parts or entities associated with the financial system 190 may be involved in different portions of the property analysis.

As illustrated, financial system 190 includes interface 191, processor 192, mortgage system 193, appraisal module 194, a credit analysis module 195, and memory 196. Interface 191 and processor 192 may be similar to or different from interfaces 102, 151 and processors 152, 103, respectively. Processor 192 executes the various modules and corresponding instructions illustrated in the financial system 190. Interface 191 allows the financial system 190 to communicate with and retrieve information from or send information to some or all of the components communicably connected via network 120.

The financial system 190 includes, and the processor 192 executes, the mortgage systems 193, the appraisal module 194, and the credit analysis module 195. The mortgage systems 193 allow the financial system to evaluate proposed mortgages for potential lending and investment. In particular, the mortgage offers are based on an appraised value of the property and a credit analysis of the potential mortgage recipient. The financial system 190 may initially provide approval or pre-approval for mortgages based on the income and credit history of potential customers. For final approval of the mortgages, however, the appraisal of the property must correspond to the amount financed. In the present illustration, the amount available to finance may be adjusted based on the actual modified price of the property. In such instances, information relating to the current appraised value and the estimated appraisal after completing the identified actions may be generated by the appraisal module 194. A credit analysis module 195 (based on customer account information 197 and customer financial history information 198 stored in memory 196) can determine the creditworthiness of the customer, and the mortgage system 193 can use this information to determine whether the amount of the modified price is approved. In some instances, the modified price may be determined prior to the presentation of the walkthrough, and the mortgage amount may be pre-approved for the customer. In those instances, the pre-approval decision can be reported to the property analysis system 150 and a notification of the same can be included in the property walkthrough. This can allow customers to understand the potential costs associated with the property and the fact that they are already pre-approved for a mortgage—or combination of mortgage and other financing option—to cover the determined price. The other financing options may include, but are not limited to, a home equity line of credit (HELOC), a home equity loan, an unsecured line of credit, a credit card offer, debt consolidation, micro-financing, P2P lending, or crowdfunding, among others.

Figure 1B:
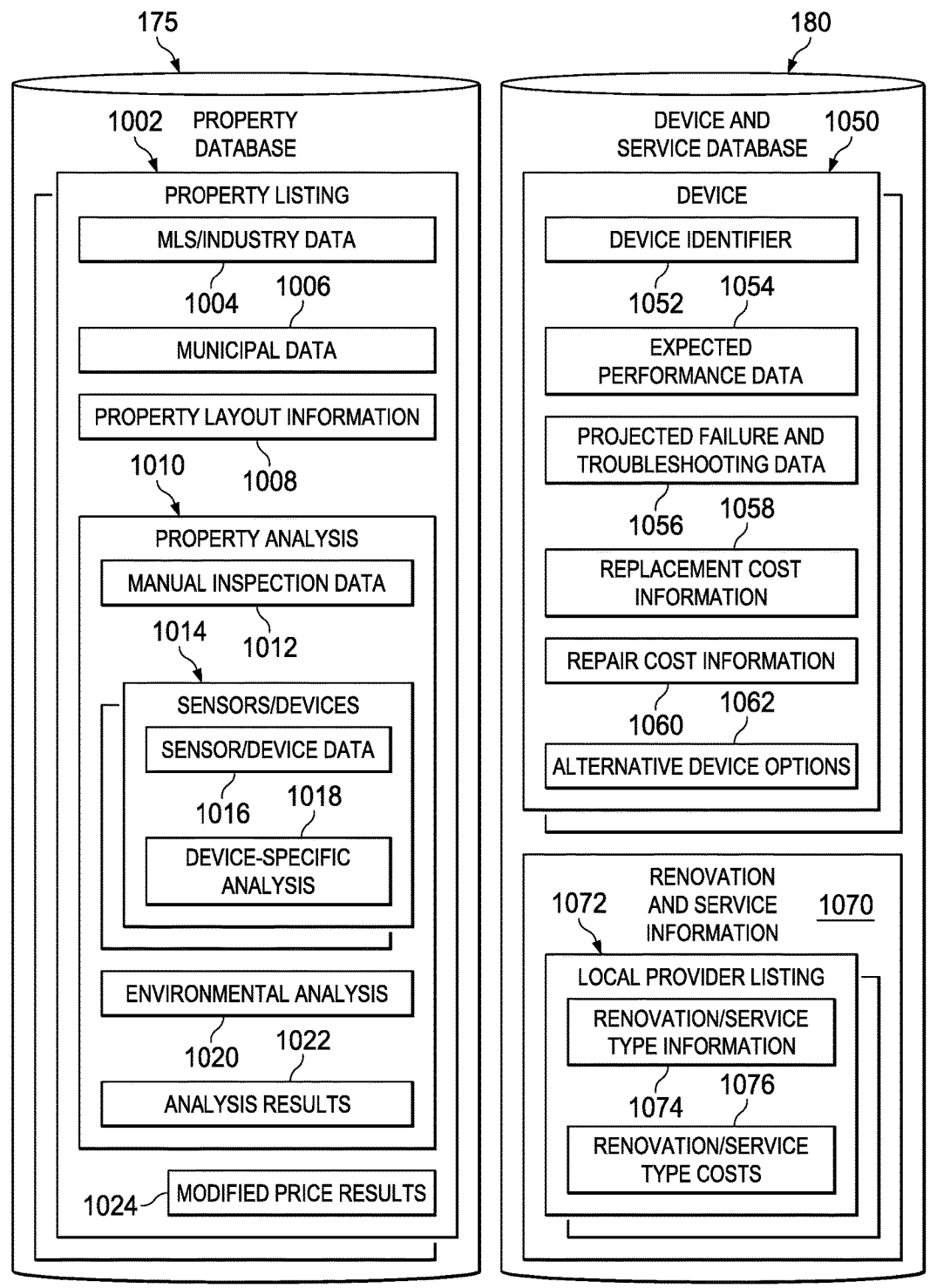

While portions of the software elements illustrated in FIGS. 1A and 1B are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

Figure 2B:
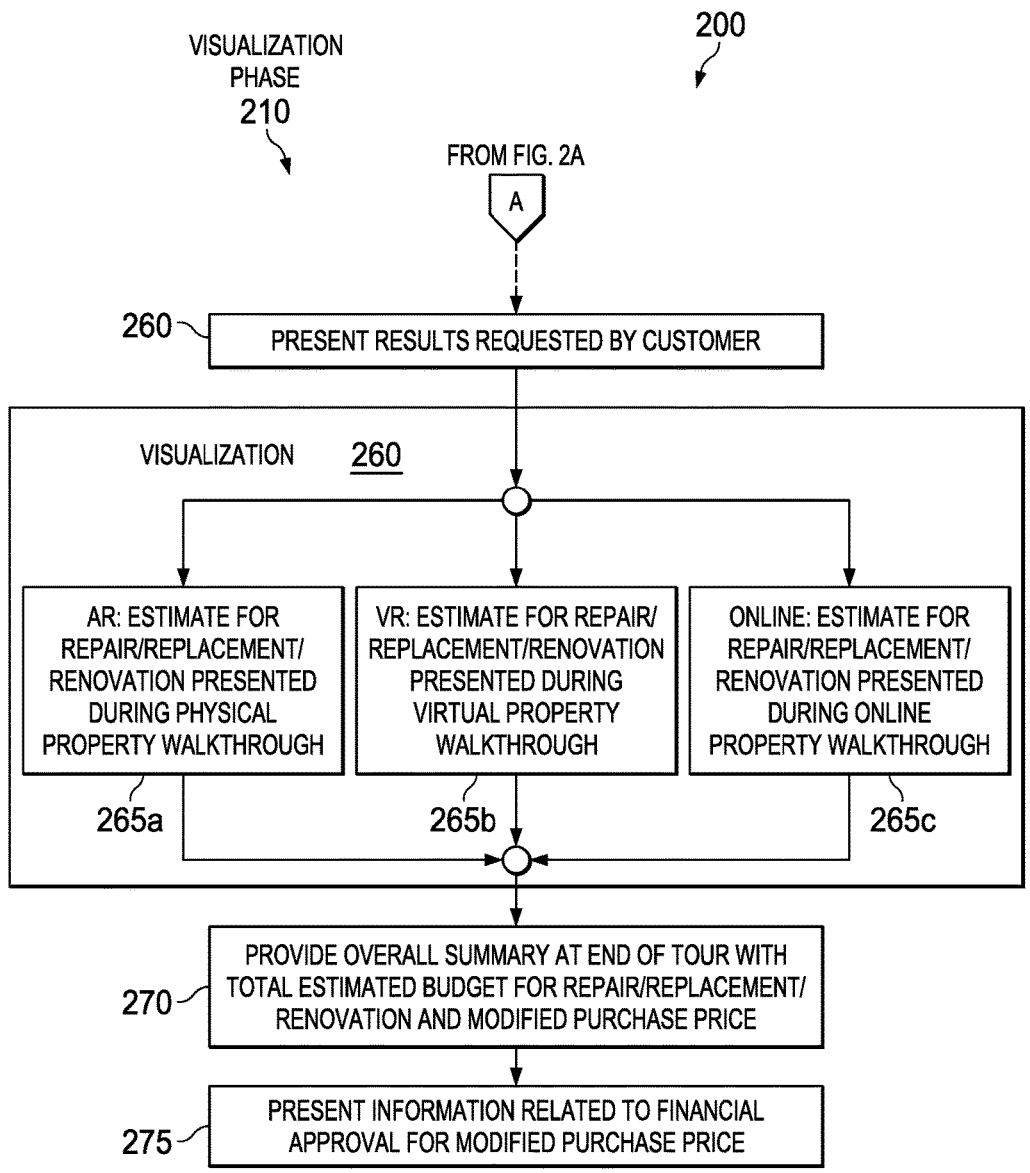

FIG. 2 (separated into connected FIG. 2A and FIG. 2B) is a swim lane diagram of an example process 200 for performing a connected device-based property evaluation. For clarity of presentation, the description that follows generally describes process 200 in the context of the system 100 illustrated in FIGS. 1A and 1B. However, it will be understood that process 200 may be performed, for example, by any other suitable system, environment, software, and hardware, or a combination of systems, environments, software, and hardware as appropriate. Further, this illustration is meant to be a simple example of potential implementations of the described tools, and is not meant to be limiting to persons of ordinary skill in the art.

In process 200, two phases are illustrated; a data collection phase 205 and a visualization phase 210. The data collection phase 205 collects data from one or more sources related to a property and determines the actions to be performed based on the collected data. Specifically, the data collection phase 205 determines whether repairs, renovations, and replacement devices are required within a threshold time period after purchase. If such actions are required, the data collection phase 205 can identify estimated costs, generate a modified price for the property based on the initial price after factoring in the cost of the actions to be performed within the threshold time period, and initiate generation of a property walkthrough presentation for the customer. In the visualization phase 210, the results of the generated presentation are presented to the customer, which includes suggested work to be performed in various locations of the property, the individual costs of the work, and the overall modified purchase price of the property based on the analysis.

At 215, the customer can identify a property for potential purchase. The identification can be an explicit indication that a property analysis as described herein should be performed for the customer. In other instances, the property analysis may be triggered by the customer's interest in the property, including an indication that the customer may want to view or otherwise receive additional information on the property prior to making a purchase decision. In some instances, the property analysis may be triggered by physically entering a property with a corresponding AR application open and/or initiated on a mobile device of the customer. For example, the application may access a previously existing property analysis upon arrival, or may initiate, either explicitly or implicitly, a property analysis to be performed via the application while at, prior to, or after physically visiting the property. In some instances, initiating the property analysis may require a fee or other charge to the customer, where those funds are used to cover the costs of adding any necessary sensors or devices to the property as necessary. In still other instances, the property analysis may be used by a realtor, appraiser, or other non-potential purchaser, such as to evaluate the best sales price of the property, an appraised value of the property, an amount for which to approve financing for the property, or other suitable uses. The analysis can be initiated in any suitable manner corresponding to the purpose of such use.

Process 200 continues to 220, where various types of data collection associated with the property are performed. As noted previously, any suitable information regarding the property may be used to assist in the property analysis and determination of what, if any, changes, repairs, replacements, or renovations may be needed. In a first instance at 220a, sensor and monitoring device data can be captured. Specifically, existing and newly placed—since the identification of the property—sensors and monitoring devices may be located or embedded within the property. In some instances, some or all of the sensors and monitoring devices may be associated with particular locations, devices, and/or systems within the property, such that information collected from those sensors and monitoring devices is associated with the corresponding location, device, or system. This allows the projected actions to be performed to be tied to a particular part of or location within the property, which in turn allows for the property walkthrough to be generated and later-determined actions/costs associated with that location. In doing so, the walkthrough presentation can be presented based on the location of the customer within the presentation.

At 220b, reference data for non-connected devices, or devices that are not specifically monitored within the property, can be collected, as well as additional information related to monitored devices for which sensor and monitoring device data is collected. The information regarding these devices may be available after an inspection of the property based on known and observed information. The information may include an identification of a particular device or devices, ages or install dates associated with the device, maintenance information related to the device, the working status of a particular device, and any other suitable information. As noted, the reference data may include additional data on devices for which information is already captured at 220a as well as for devices for which no information is captured. An example of a possible non-connected and non-monitored device may be the roof of the property. Some roofs may be monitored and/or connected. Information related to the age of the roof as well as the results of a visual inspection may be collected at 220b. Similarly, an HVAC system which is being monitored and for which data is collected at 220a may also have additional information collected at 220b, including the date of install of the system, the geography and climate information of the property, maintenance records related to the system, and other relevant information. By combining these sets of information, better and more accurate analyses can be made. In some instances, the reference data may include tagged devices and infrastructure, including those tagged via bar codes and QR codes, allowing for quick scanning and capturing of data during a manual inspection.

At 220c, the property analysis system can collect additional public information, such as information included in a property listing or property description, municipal records (e.g., permit records), tax assessor records, and other relevant information. In some instances, insurance records may be obtained to identify any potential losses or damage information that may be associated with devices and structural portions of the property. This information can assist in identifying a time of particular prior renovations, the type and age of upgraded devices (e.g., appliances) and property infrastructure (e.g., roof, HVAC), a scope and timeline of prior work, as well as other information. Any suitable data source may be used and can provide support for the property analysis, including private data sources and proprietary data sources. For example, information related to product or device warranties may be available, as well as information from one or more service providers related to prior services performed. Other private data sources may be used to supplement and/or provide data used in the property analysis.

Any suitable combination of data collection techniques can be applied at 220, including additional, fewer, and/or alternative operations of those described here.

At 225, determinations as to potential corrective actions to be performed or suggested to be performed are made. As described in reference to FIG. 1A-B, a property analysis may include a device failure determination, a renovation analysis, and any other suitable analysis that can determine the likelihood of the need for corrections to or suggested actions for particular aspects of the property within a threshold timeframe. These determinations can be based on an end of life or failure analysis of particular devices based on the collected information, as well as on issues identified with the infrastructure of the property (e.g., based on environmental readings, such as humidity, determined leaks, faulty or aging wiring, etc.).

At 230, a determination is made as to whether those actions are needed within a threshold time frame post-purchase. For example, the threshold may be set as 6 months after purchase. If a device is determined to have 18 months left in its expected lifespan or until failure, the repair or replacement of that device will not be included in the modified purchase price as described herein. However, if an action is determined within the example 6 month threshold, then the action can be included in the modified purchase price analysis. In some instances, the customer may identify specific actions to be taken upon purchase, including renovations or device replacement (e.g., new applications) among others. In such instances, those customer-specific actions can be included in the modified price evaluation in addition to any detected issues as identified in 220, as those customer-specific actions may not be identified during the property analysis and issue determination of 225. If no actions are determined to be needed within the threshold time frame, then process 200 moves to 235, where the process can end. Alternatively, the property walkthrough may be generated as normal but without including any suggested or required actions. In some instances, while an action is not within the threshold time frame, the action may be included in the modified price determination where the estimated costs of the action exceed its own threshold. For example, a cost-based threshold may be defined and considered. In those instances, the higher cost actions may be included at 230 or re-added to the modified price evaluation at a later time.

If at least one action is identified as needed or suggested within the threshold time frame, process 200 continues at 240. At 240, the particular actions identified are associated with particular locations on or within the property. This association may be known based on collected information from 220 or another source, and may be used to tie those actions to a particular part of the property in anticipation of generating the interactive property walkthrough. In some instances, the association may be made later or earlier in process 200, as appropriate.

At 245, process 200 and the property analysis system can, based on the identified actions, collect estimated costs information corresponding to the identified actions. This information may be collected from any of a plurality of sources. As examples, cost estimate information may be based on a device analysis and database, where repair and replacement costs, as well as alternative devices to consider, may be available. Depending on the type of issue being identified, the estimated cost analysis may include a determination of the type of action to perform, such as whether to repair a particular device or whether to replace the particular device. This decision may be made based on industry information, cohort analyses of persons or entities similar to the customer having experience with the same or similar devices, and based on a cost analysis of the lifespan from a new or alternative device versus a temporary repair. Similarly, information on the costs to address structural issues and/or renovations may be estimated based on industry or vendor-provided cost estimates. In some instances, the system performing the analysis may automatically contact or solicit quotes from particular vendor systems, and may return estimated pricing. The type of action to be performed can determine which vendors or industry databases and other data sources from which to obtain the cost estimates.

In some instances, at least a portion of the cost information may be maintained within the system performing the property analysis. Alternatively, some or all of the information may be obtained from external sources. Once the estimated cost information is collected, the cumulate costs can be added to the initial purchase price of the property to determine the modified price of the property.

At 250, a change in the value of the identified property based on one or more of the identified actions can be determined. The value may be a determined market value, an appraisal value, a lot value, or any other suitable value used by the customer, other buyers, real estate agents, sellers, insurers, or lenders to evaluate a property. In some instances, this determination may be made by an outside system, such as an automated appraisal system or via manual updates to the appraised value. The updated appraisal can determine the likely or estimated market value of the property after the suggested actions are taken. This information can be used by a financial institution or lender to determine whether or not the customer is to be approved for financing of the modified purchase price. For example, if the modified purchase price is significantly above the estimated appraised value of the property after the actions are taken, and the customer would require financing to perform the actions in addition to the purchase, the lender may be able to determine that a mortgage or mortgage plus other financing is not economically prudent or allowable. In cases where the appraised value of the actions, including projected renovations, is significantly higher than the modified or modified purchase price, the lender may approve financing for the modified purchase price as opposed to the actual sales price of the property. As previously noted, the property analysis can be tightly coupled with a customer's lender such that financing decisions can be made prior to the property walkthrough with pre-approval provided to the customer no later than the end of the property walkthrough, as well as sooner.

In some instances, the costs of the estimated actions to be taken may also generate or cause a suggested reduction of the initial price, such as an offer price for purchase. For example, a faulty or failing roof may cost $10,000 to replace, but may result in a reduction of the offer price by some or all of the replacement cost, for example, $5,000. Similar property issues may cause the property analysis system to suggest a reduced offer price of the property, where the change in the offer price is then included within the modified price analysis.

At 255, the walkthrough presentation is generated. Generating the walkthrough presentation can include identifying property layout or orientation information that defines particular rooms, locations, and areas within the property. In some instances, the property layout information may include a two-dimensional or three-dimensional representation of the property. In some instances, the property layout may be based on video or image frames captured of the property, where the video and image frames are associated with particular locations within the property. These video and image frames may be used to generate a virtual walkthrough of the property, allowing a VR-capable device to allow users to view the property in a virtual presentation. Information related to the identified issues, including estimated cost information, may be associated with particular virtual locations within the presentation and presented during the virtual reality-based property walkthrough.

Alternatively or in addition to the virtual reality presentation, the video and images or other property layout information may be used to associate particular images, reference characteristics (e.g., devices, structural references, etc.) with particular locations within the property. When the display device identifies an image corresponding to the images and reference characteristics, the action and cost information may be presented. Alternatively, relative or absolute location information may be associated with the various locations within the property, such that the location of particular issues may be identified when the customer is viewing the property walkthrough presentation in the corresponding locations. In those instances, the GPS or other location-defining information defining the location of the display device can identify the current location of the customer, and present the augmented reality presentation to the customer. Additionally, smart tags (e.g., QR codes, barcodes, RFID tags, NFC tags, and other sensors including beacons) may be placed in particular locations of the property and identified or scanned by the display device (e.g., augmented reality device) to present an augmented reality display of the issues associated with the location and the estimated costs. The augmented reality display may be presented during a physical walkthrough of the property, and can present the issues and actions associated with different locations within the property.

In an online walkthrough presentation, images or videos of the property may be enhanced with information on the one or more actions to be performed in various locations within the property. The presentation may allow customers to imitate or virtually walk through the property using their browser or a dedicated application, where a video or image of a particular location and any identified issues are presented along with an illustration of the particular location.

In some instances, multiple versions of the walkthrough presentations may be generated, such as versions for a virtual reality presentation, an augmented reality presentation, or an online presentation. Other suitable presentation types may be prepared. In other instances, a subset of such versions may be presented based on the likely usage and capabilities of the customer or presentation provider.

In some instances, generating the presentation may include generating a standard or formatted report, as well as a raw data file (e.g., a data extract, a delimited file, an XML, file, etc.). The generated presentation can then be consumed and presented by multiple systems and software.

Process 200, upon completion of the walkthrough presentation, moves to the visualization phase 210, and begins at 260, where the presentation of the results of the analysis are requested by the customer. At 265, the walkthrough presentation is presented to the customer through one or more alternative mediums. At 265a, an augmented reality presentation is provided. In such instances, the customer may use his or her own device to present the walkthrough or may be given a specific augmented reality display device to use while on location at the property. The customer may tour (either in a guided manner or in an unguided manner) through the property, with determinations as to the customer's location being made by the display device and presentation system. When the customer is at a location corresponding to at least one action, the actions and estimated costs for that location can be presented in an augmented reality display, such as overlaying reality with the augmented or virtual presentation.

At 265b, a virtual reality presentation is provided. In such instances, the customer may be provided with or have available a virtual reality display device for viewing the walkthrough presentation. Through inputs received at the display device the display device can determine a corresponding virtual location within the property being viewed. Any actions and estimated costs associated with the present location can be presented in the virtual reality display.

At 265c, an online presentation is provided. In such instances, the customer can navigate a web browser or other application(s) through a virtual walkthrough of the property. The display may show an image or illustration of a particular location within the property such that the corresponding actions and estimated costs are displayed along with the particular location. In some instances the online presentation may use video or images of or captured at the property to display the walkthrough, while in other a general blueprint or layout view may be provided.

In some instances, the display device may be able to receive inputs from the customer identifying one or more additional actions to be performed. For example, a customer may indicate that an optional action is to be performed in a particular location, such as painting a particular room, wall, or other part of the property, or replacing a device or appliance. The display device may share or send this information to the property analysis system, such that information related to the optional addition can be added to and included in the modified price calculation. In some instances, the action and cost estimate may be added to the presentation in real-time with the modified price being adapted to include the optional actions and costs.

Upon completion of the walkthrough, the customer may be provided, at 270, with an overall summary providing a listing of each identified action, the estimated budget for costs associated with those actions, and a modified purchase price. As noted, the modified purchase price may be adjusted based on a lower offer price for the property after determining the actions to be performed. In some instances, the overall summary may include options for the customer to decline or delay, where the modified purchase price may be adjusted based on the decision not to perform the action, or not to include the action in the modified purchase price.

In some instances, process 200 may continue after presenting the modified purchase price by providing, at 275, a summary or indication associated with a lender of whether the customer is approved or pre-approved for financing related to the modified purchase price. The financing approval may be updated based on customer interaction during the walkthrough, or may include a range for which the customer is approved.

Figure 3:
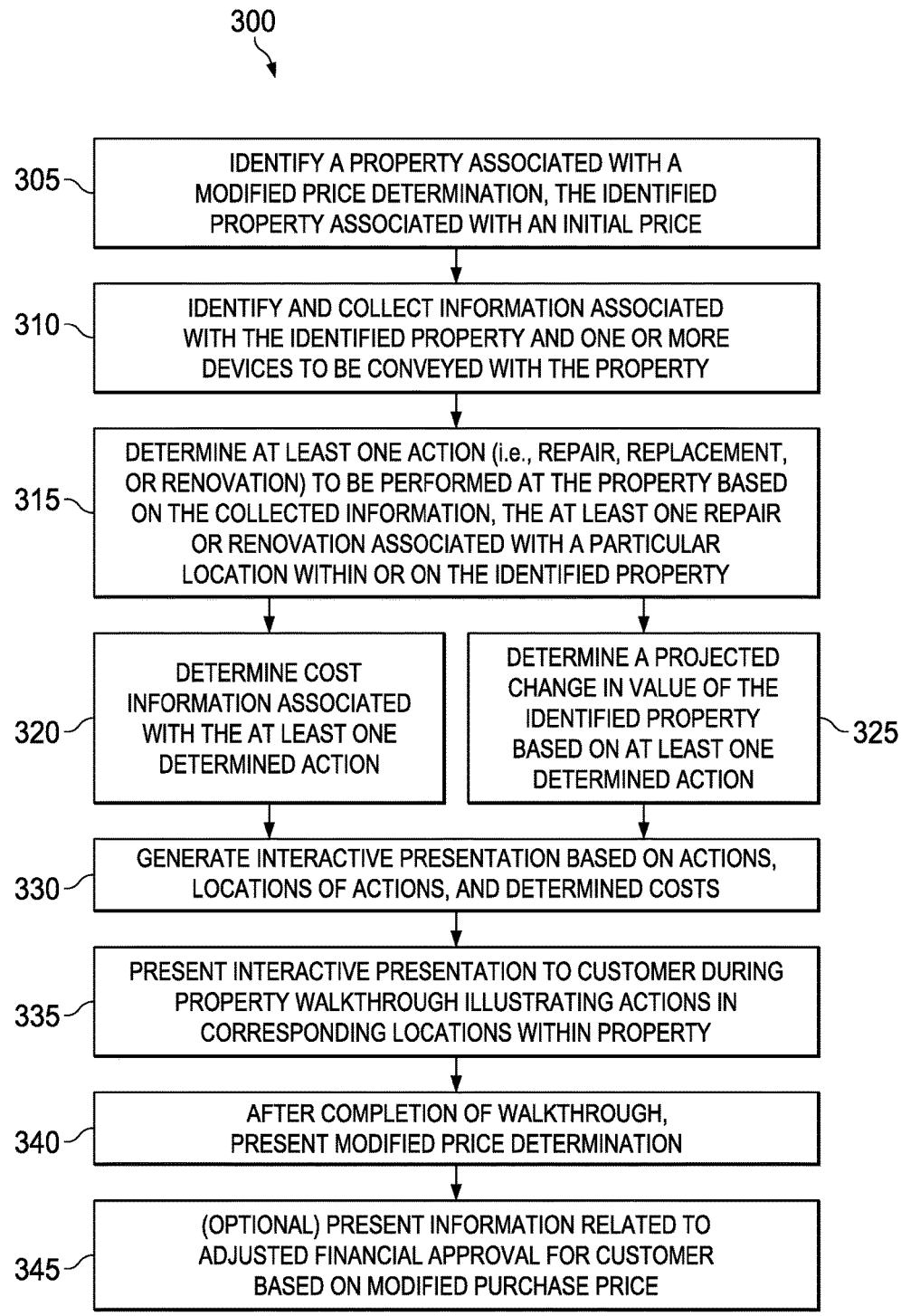
FIG. 3 is a flowchart of example operations for performing a connected device-based property evaluation and presenting results of the same from the perspective of a property analysis system.

FIG. 3 is a flowchart of example operations for a method 300 performing a connected device-based property evaluation and presenting results of the same from the perspective of a property analysis system. For clarity of presentation, the description that follows generally describes method 300 in the context of the system 100 illustrated in FIG. 1. However, it will be understood that method 300 may be performed, for example, by any other suitable system, environment, software, and hardware, or a combination of systems, environments, software, and hardware as appropriate.

At 305, a property associated with a modified price determination and property evaluation is identified. The identified property may be associated with a current offer or purchase price, where the offer or purchase price is an amount to be paid by the purchaser. The property may be identified explicitly by a customer, or the property may be implicitly identified based on interests of the customer, such as by browsing or indicating a particular property for further research and consideration. In some instances, the property may be identified by an entity other than a prospective purchaser, including by a real estate agent, a seller of the property, a financial institution, or any other appropriate entity.

At 310, information associated with the identified property is identified and collected. Specifically, at least a portion of the information may be associated with one or more monitoring devices capturing information at the identified property. The monitoring devices can capture device- and/or appliance-specific information, as well as environmental data. The captured data and information can be used to determine the lifespan or potential failure of one or more devices or appliances at the property, as well as information on particular repairs and renovations that may need to be performed on the devices and appliances, as well as on structural or mechanical portions of the property's structure. Additional information from other data sources may also be collected, including static information describing the property, the property's status, the age of the property, prior renovations, and other property-related data.

Based on the collected information, at least one action to be performed at the property is determined. The at least one action may include repairing a device or portion of the property's infrastructure, replacing a device, or renovating the property, among others. Generally, these portions of the property may be identified as an element of the property. Each action that is determined can be associated with a particular location within or on the identified property. This can allow a presentation presenting the issues and determined actions relative to the location within the property where those issues and actions correspond. In doing so, a virtual or augmented reality-based walkthrough can provide customers the ability to visualize where and what actions may be needed at or shortly after purchase of the property. The actions to be performed may be based on an analysis of the collected information, where the collected information is used to identify one or more potential or upcoming issues with the property and its components, devices, or infrastructure that are identifiable at purchase time and will require additional costs to perform within a threshold time frame after purchase. In some instances, the determined actions may be specifically specified by the customer, such as planned renovations to the property or replacement of particular devices. In those instances, the customer-indicated actions can be included with the set of determined actions identified from the collected data and used in determining the modified purchase price of the property.

Upon determining the at least one action to be performed, method 300 continues at both 320 and 325. These operations may be performed concurrently, simultaneously, or sequentially, the illustration is not meant to be limiting. At 320, cost information associated with each of the at least one determined actions can be determined. To do so, one or more industry or manufacturing databases may be accessed or made available that provides information on the estimated repair, replacement, renovations, or other action-related costs associated with a particular determined action. In some instances, particular vendors may be contacted or vendor-provided databases may be searched. Additionally, information available identifying costs of similar work or actions performed for other customers and/or entities may be considered and used in determining the estimated costs. Any suitable method of obtaining estimated cost information may be used, and the cost information may be stored and available at any suitable location, including at the property analysis system, at a vendor-based system, at a contractor, at an industry-provided system, or at a system maintained by a financial institution. The estimated costs of actions to be performed may be added to the purchase price or current offered selling price of the property to determine its modified purchase price. In some instances, the modified purchase price may be adjusted downward by at least a portion of the estimated costs associated with the determined actions.

At 325, a projected change in the market value of the identified property can be determined based on the status of the property after performing the determined actions. This determination may be based on an automated appraisal, where the information on the results of the performed actions are used as inputs to determine whether the costs of the actions result in a higher or different market value. This information can be extremely useful to customers, realtors, appraisers, prospective purchasers, and lenders, in that a determination can be made as to the appropriate selling price based on performing the required or suggested actions, as well as whether the estimated costs of the suggested actions are justified in light of the estimated market value. Further, financial institutions may be able to use the estimated market value in determining whether or not to offer extended financing above the selling price to include at least a portion of, if not all, of the modified purchase price.

At 330, an interactive walkthrough presentation is generated based on the determined actions, the corresponding costs, and the market value change of the property in light of the determined actions. The presentation may be generated for an augmented or virtual reality-based presentation. In an augmented reality presentation, information relating to determined actions and associated costs may be linked to or associated with particular locations within the property where those actions are to be performed. During a physical walkthrough of the property, the augmented reality presentation can present and provide information on the actions and costs associated with the current location of the customer. In a virtual reality presentation, a virtual version of the property may be created which can allow the customer to virtually tour the property. When the virtual version of the customer arrives in a particular location, a virtual display of the actions and costs associated with the location can be presented. In other instances, an online presentation may be generated allowing customers to view a property layout or virtual tour of the property in a browser or dedicated application. As the customer navigates to particular locations, a display of the actions and costs associated with the particular location can be presented. In some cases, multiple versions of the presentation may be generated, e.g., for both augmented and virtual reality. In other instances, fewer than all or a single version may be generated. Once generated, the presentation(s) can be stored for use and execution at a later time.

At 335, the interactive presentation is presented to the customer during a property walkthrough. The property walkthrough may be a physical walkthrough at the actual location of the property, or the walkthrough may be a virtual walkthrough performed at any location where sufficient presentation equipment is available (e.g., a virtual reality device). The presentation can allow the customers to move from location to location within the property. As the customer arrives at a new location, information on the determined actions and estimated costs can be provided to the customer. In an augmented reality presentation, virtual information can be presented on a smartphone, AR-equipped device (e.g., Google Glass), or on any other suitable device. In a virtual reality presentation, the virtual environment may be presented with additional virtual information representing the determined actions and costs can be presented on a VR-equipped device (e.g., Oculus Rift).

At 340, after completing the walkthrough, the modified purchase price determination can be presented to the customer. In some instances, a running total of the amount may be presented to the customer as each new location is visited physically or virtually. At the end of the walkthrough, a summary of the estimated costs and resultant modified purchase price may be made available. Further, at optional 345, information from a financial institution indicating whether financing approval or pre-approval for the modified purchase price is available for the customer.

The preceding figures and accompanying description illustrate example systems, processes, and computer-implementable techniques. While the illustrated systems and processes contemplate using, implementing, or executing any suitable technique for performing these and other tasks, it will be understood that these systems and processes are for illustration purposes only and that the described or similar techniques may be performed at any appropriate time, including concurrently, individually, or in combination, or performed by alternative components or systems. In addition, many of the operations in these processes may take place simultaneously, concurrently, and/or in different orders than as shown. Moreover, the illustrated systems may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A system comprising:
   at least one processor interoperably coupled with a memory;
   the memory configured to store instructions for execution by the at least one processor, wherein the instructions instruct the at least one processor to:
   identify a property to be associated with an interactive walkthrough presentation, the identified property associated with an initial price and a set of property-specific information stored in a property database storing property-specific information for a plurality of properties, the set of property-specific information associated with the identified property identifying one or more connected devices located at the property, each of the connected devices having a sensor to monitor a condition at a particular location within the identified property;
   automatically, in response to identifying the property, collect information from the property database and the set of property-specific information associated with the one or more connected devices associated with the identified property, wherein each of the one or more connected devices provide information about the corresponding monitored condition, the information about the corresponding monitored condition associated with a current status of the identified property at the particular location monitored by the connected device;
   automatically determine at least one action to be performed at the property based on the collected information and at least one of the monitored conditions, each of the at least one determined actions corresponding to an element at a corresponding location within the property;
   determine a set of cost information corresponding to each of the at least one determined actions;
   determine an aggregate cost of the determined cost information associated with each of the at least one determined actions;
   combine the initial price of the property with the aggregate cost of the determined cost information to determine a modified price;
   generate the interactive walkthrough presentation of the identified property based on the at least one determined action and the corresponding set of determined cost information for each of the at least one determined actions, wherein the interactive walkthrough presentation associates each determined action and corresponding set of determined cost information to the corresponding locations within the property; and
   present, via a user interface, the modified price during a presentation of the interactive walkthrough presentation, wherein presenting the modified price includes:
      determining, during the presentation of the interactive walkthrough presentation, a current location within the property associated with the presentation of the interactive walkthrough presentation;
      identifying one or more determined actions associated with current location within the property; and
      presenting information associated with the one or more determined actions associated with the current location within the property, each of the one or more determined actions associated with the cost information corresponding to the particular determined action.

2. The system of claim 1, wherein monitoring conditions at particular locations within the identified property includes monitoring operations of one or more particular devices at particular locations within the identified property.

3. The system of claim 2, wherein monitoring operations of the one or more particular devices at particular locations includes performing an end-of-life analysis to determine a remaining life span of the one or more particular devices.

4. The system of claim 3, wherein determining at least one action to be performed at the property based on the collected information includes, in response to determining that the remaining life span of the one or more particular devices is less than a threshold amount, determining that an action corresponding to the one or more particular devices is required.

5. The system of claim 4, wherein the determined action corresponding to the one or more particular devices is repairing or replacing the one or more particular devices.

6. The system of claim 1, wherein monitoring conditions at particular locations within the identified property includes monitoring environmental conditions at the particular locations, and wherein monitoring environmental conditions at particular locations includes identifying at least one environmental condition outside a threshold condition.

7. The system of claim 6, wherein determining at least one action to be performed at the property based on the collected information includes, in response to determining that the at least one environmental condition at the particular locations is outside a threshold condition, determining that an action corresponding to the one or more connected devices is required, and wherein the determined action corresponding to the one or more particular locations is performing a repair or renovation of the identified property at the corresponding particular location.

8. The system of claim 1, wherein the generated interactive walkthrough presentation is generated for an augmented reality presentation presented during a physical walkthrough of the identified property, and wherein presenting the modified price comprises:

presenting the interactive walkthrough presentation of the identified property to a potential purchaser during a physical walkthrough of the identified property, wherein the determined actions and corresponding set of determined cost information are presented to the potential purchaser in an augmented reality presentation in response to the potential purchaser during the physical walkthrough of the identified property.

9. The system of claim 1, wherein the generated interactive walkthrough presentation is generated for a virtual reality presentation presented during a virtual walkthrough of the identified property, and wherein presenting the modified price comprises:

presenting the interactive walkthrough presentation of the identified property to a potential purchaser during a virtual walkthrough of the identified property, wherein the determined actions and corresponding set of determined cost information are presented to the potential purchaser in a virtual reality presentation in response to the potential purchaser during the virtual walkthrough of the identified property.

10. The system of claim 1, wherein the modified price is a modified purchase price, wherein the instructions instruct the at least one processor to:

provide the modified purchase price to a lender associated with a potential purchaser in response to generating the interactive walkthrough presentation;

receive an indication from the lender indicating whether the potential purchaser is approved for funding based on the provided modified purchase price, wherein the indication whether the potential purchaser is approved for funding based on the modified purchase price is based on an calculated estimated appraisal of the identified property after the at least one determined action is performed; and present the indication to the potential purchaser during the interactive walkthrough.

11. The system of claim 1, wherein identifying the property includes identifying at least one potential purchaser-specified renovation, and wherein the determining the at least one action to be performed at the property includes determining at least one action associated with the at least one potential purchaser-specified renovation, and wherein the at least one potential purchaser-specified renovation is received during the interactive walkthrough.

12. The system of claim 1, wherein presenting the modified price during the presentation of the interactive walkthrough presentation further includes:

determining an updated current location within the property associated with the presentation of the interactive walkthrough presentation;

identifying, based on the determined at least one action to be performed, one or more determined actions associated with updated current location within the property; and presenting information associated with the one or more determined actions associated with the updated current location within the property, each of the one or more determined actions associated with the cost information corresponding to the particular determined action.

13. The system of claim 12, wherein presenting the modified price during the presentation of the interactive walkthrough presentation includes:

determining completion of the presentation of the interactive walkthrough presentation; and in response to determining completion of the presentation of the interactive walkthrough presentation, presenting an overall summary of the modified price and the determined at least one actions to be performed.

14. A computerized method performed by one or more processors, the method comprising:

identifying a property to be associated with an interactive walkthrough presentation, the identified property associated with an initial price and a set of property-specific information stored in a property database storing property-specific information for a plurality of properties, the set of property-specific information associated with the identified property identifying one or more connected devices located at the property, each of the connected devices having a sensor to monitor a condition at a particular location within the identified property;

automatically, in response to identifying the property, collecting information from the property database and the set of property-specific information associated with the one or more connected devices associated with the identified property, wherein each of the one or more connected devices provide information about the corresponding monitored condition, the information about the corresponding monitored condition associated with a current status of the identified property at the particular location monitored by the connected device;

automatically determining at least one action to be performed at the property based on the collected information and at least one of the monitored conditions, each of the at least one determined actions corresponding to an element at a corresponding location within the property;

determining a set of cost information corresponding to each of the at least one determined actions;

determining an aggregate cost of the determined cost information associated with each of the at least one determined actions;

combining the initial price of the property with the aggregate cost of the determined cost information to determine a modified price;

generate the interactive walkthrough presentation of the identified property based on the at least one determined action and the corresponding set of determined cost information for each of the at least one determined actions, wherein the interactive walkthrough presentation associates each determined action and corresponding set of determined cost information to the corresponding locations within the property; and presenting, via a user interface, the modified price during a presentation of the interactive walkthrough presentation, wherein presenting the modified price includes:

determining, during the presentation of the interactive walkthrough presentation, a current location within the property associated with the presentation of the interactive walkthrough presentation;

identifying one or more determined actions associated with current location within the property; and presenting information associated with the one or more determined actions associated with the current location within the property, each of the one or more determined actions associated with the cost information corresponding to the particular determined action.

15. The method of claim 14, wherein monitoring operations of the one or more particular devices at particular locations includes performing an end-of-life analysis to determine a remaining life span of the one or more particular devices, and wherein determining at least one action to be performed at the property based on the collected information includes, in response to determining that the remaining life span of the one or more particular devices is less than a threshold amount, determining that an action corresponding to the one or more particular devices is required, wherein the determined action is one of repairing or replacing the one or more particular devices.

16. The method of claim 14, wherein monitoring conditions at particular locations within the identified property includes monitoring environmental conditions at the particular locations, and wherein monitoring environmental conditions at particular locations includes identifying at least one environmental condition outside a threshold condition, wherein determining at least one action to be performed at the property based on the collected information includes, in response to determining that the at least one environmental condition at the particular locations is outside a threshold condition, determining that an action corresponding to the one or more connected devices is required, and wherein the determined action corresponding to the one or more particular locations is performing a repair or renovation of the identified property at the corresponding particular location.

17. The method of claim 14, wherein the generated interactive walkthrough presentation is generated for an augmented reality presentation, the interactive walkthrough presentation based on the at least one determined action and the corresponding set of determined cost information for each of the at least one determined action, wherein the interactive walkthrough presentation associates each determined action and corresponding set of determined cost information to the corresponding location within the property; and presenting the interactive walkthrough presentation of the identified property to a potential purchaser during a physical walkthrough of the identified property via an augmented reality device, wherein the determined actions and corresponding set of determined cost information are presented to the potential purchaser in an augmented reality presentation in response to the potential purchaser reaching the corresponding locations within the property during the physical walkthrough of the identified property.

18. A non-transitory, computer-readable medium storing computer-readable instructions executable by a computer, wherein the computer-readable instructions instruct the computer to:

identify a property to be associated with an interactive walkthrough presentation, the identified property associated with an initial price and a set of property-specific information stored in a property database storing property-specific information for a plurality of properties, the set of property-specific information associated with the identified property identifying one or more connected devices located at the property, each of the connected devices having a sensor to monitor a condition at a particular location within the identified property;

automatically, in response to identifying the property, collect information from the property database and the set of property-specific information associated with the one or more connected devices associated with the identified property, wherein each of the one or more connected devices provide information about the corresponding monitored condition, the information about the corresponding monitored condition associated with a current status of the identified property at the particular location monitored by the connected device;

automatically determine at least one action to be performed at the property based on the collected information and at least one of the monitored conditions, each of the at least one determined actions corresponding to an element at a corresponding location within the property;

determine a set of cost information corresponding to each of the at least one determined actions;

determine an aggregate cost of the determined cost information associated with each of the at least one determined actions;

combine the initial price of the property with the aggregate cost of the determined cost information to determine a modified price;

generate the interactive walkthrough presentation of the identified property based on the at least one determined action and the corresponding set of determined cost information for each of the at least one determined actions, wherein the interactive walkthrough presentation associates each determined action and corresponding set of determined cost information to the corresponding locations within the property; and present, via a user interface, the modified price during a presentation of the interactive walkthrough presentation, wherein presenting the modified price includes:
determining, during the presentation of the interactive walkthrough presentation, a current location within the property associated with the presentation of the interactive walkthrough presentation;
identifying one or more determined actions associated with current location within the property; and
presenting information associated with the one or more determined actions associated with the current location within the property, each of the one or more determined actions associated with the cost information corresponding to the particular determined action.

19. The medium of claim 18, wherein monitoring operations of the one or more particular devices at particular locations includes performing an end-of-life analysis to determine a remaining life span of the one or more particular devices, and wherein determining at least one action to be performed at the property based on the collected information includes, in response to determining that the remaining life span of the one or more particular devices is less than a threshold amount, determining that an action corresponding to the one or more particular devices is required, wherein the determined action is one of repairing or replacing the one or more particular devices.

* * * * *